United States Patent
Konolige et al.

(10) Patent No.: US 9,205,562 B1
(45) Date of Patent: Dec. 8, 2015

(54) INTEGRATION OF DEPTH POINTS INTO A HEIGHT MAP

(71) Applicant: Google Inc., Mountain View, CA (US)

(72) Inventors: Kurt Konolige, Menlo Park, CA (US); Cedric Cagniart, Palo Alto, CA (US)

(73) Assignee: GOOGLE INC., Mountain View, CA (US)

( * ) Notice: Subject to any disclaimer, the term of this patent is extended or adjusted under 35 U.S.C. 154(b) by 0 days.

(21) Appl. No.: 14/577,664

(22) Filed: Dec. 19, 2014

Related U.S. Application Data

(60) Provisional application No. 62/043,514, filed on Aug. 29, 2014.

(51) Int. Cl.
| | |
|---|---|
| G06F 7/00 | (2006.01) |
| G06F 19/00 | (2011.01) |
| B25J 9/16 | (2006.01) |
| B25J 19/02 | (2006.01) |

(52) U.S. Cl.
CPC ............. *B25J 9/1694* (2013.01); *B25J 19/02* (2013.01); *Y10S 901/09* (2013.01); *Y10S 901/46* (2013.01)

(58) Field of Classification Search
None
See application file for complete search history.

(56) References Cited

U.S. PATENT DOCUMENTS

| | | |
|---|---|---|
| 7,003,136 B1 | 2/2006 | Harville |
| 8,233,660 B2 | 7/2012 | Fritsch et al. |
| 8,260,007 B1 * | 9/2012 | Furukawa et al. ............ 382/113 |
| 8,718,837 B2 | 5/2014 | Wang et al. |
| 2005/0015201 A1 | 1/2005 | Fields et al. |
| 2007/0229791 A1 * | 10/2007 | Inoue .............................. 355/67 |
| 2013/0163879 A1 | 6/2013 | Katz et al. |

* cited by examiner

*Primary Examiner* — Yolanda Cumbess
(74) *Attorney, Agent, or Firm* — McDonnell Boehnen Hulbert & Berghoff LLP

(57) ABSTRACT

An example method includes receiving a plurality of detected depth points indicative of depths of at least one surface and determining a projection of the detected depth points onto a plane. The method may also include identifying a plurality of first detected points, where a first detected point comprises a first point at a particular location of the plane in the projection. The method may also include storing digital entries corresponding to points located within a threshold buffer from one of the first detected points relative to the plane. The method may additionally include determining values for the digital entries, where a value for a digital entry corresponding to a particular point comprises an accumulation of distances from detected depth points that cross the particular point. The method may further include determining a digital height map representative of heights of the at least one surface relative to the plane.

20 Claims, 19 Drawing Sheets

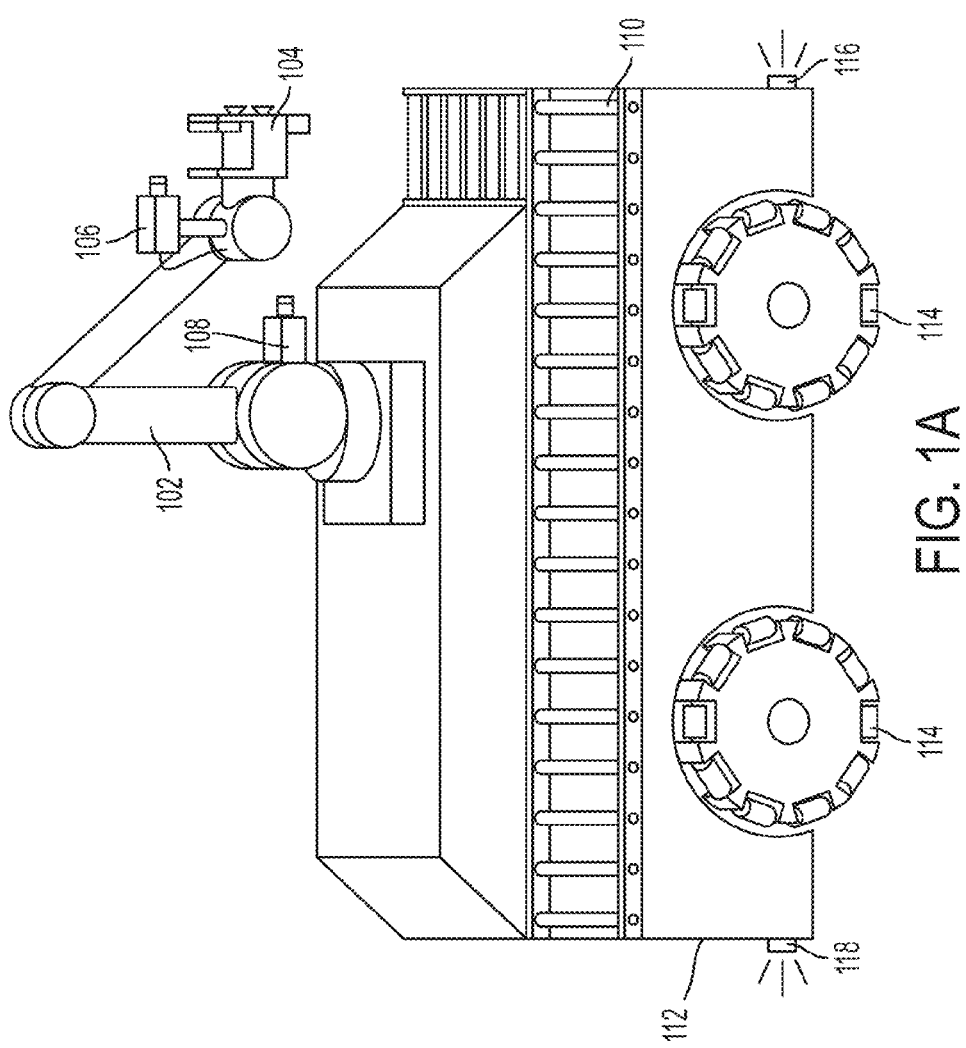

INTEGRATION OF DEPTH POINTS INTO A HEIGHT MAP

CROSS REFERENCE TO RELATED APPLICATION

The present application claims priority to U.S. Provisional patent application Ser. No. 62/043,514, filed on Aug. 29, 2014, and entitled "Integration of Depth and Normals into a Height Map," which is herein incorporated by reference as if fully set forth in this description.

BACKGROUND

Robotic systems, such as a robotic arm containing a gripping component, may be used for applications involving picking up or moving objects. For instance, a robotic device may be used to fill a container with objects, create a stack of objects, or unload objects from a truck bed. In some cases, all of the objects may be of the same type. In other cases, a container or truck may contain a mix of different types of objects, such as boxed items, cans, tires, or other stackable objects. Such robotic systems may direct a robotic arm to pick up objects based on predetermined knowledge of where objects are in the environment.

SUMMARY

The present disclosure includes methods that may be used to determine a digital height map of a portion of an environment. In particular, one or more depth sensors may be used to detect points on surfaces within the environment. The detected points may then be projected onto a plane within the environment (e.g., by using orthographic projection). First points at locations in the projection may be identified as first detected points. Digital entries may then be stored corresponding to points located within a threshold buffer of a first detected point relative to the plane (e.g., columns of points relative to the ground floor). Values for the digital entries corresponding to particular points may then be determined by accumulating distances to detected depth points along one or more rays from a depth sensor to a detected depth point that cross the particular points. Points where the values in the digital entries cross zero may then be used to determine heights of surfaces relative to the plane for determination of a digital height map.

In one example, a method is provided that includes receiving, from at least one depth sensor, a plurality of detected depth points indicative of depths of at least one surface within an environment along rays from the at least one depth sensor. The method may further include determining, by a computing device, a projection of the plurality of detected depth points onto a plane within the environment. The method may also include identifying, by the computing device, a plurality of first detected points from the plurality of detected depth points, where a first detected point comprises a first point at a particular location of the plane in the projection. The method may also include storing, by the computing device, digital entries corresponding to points located within a threshold buffer from one of the first detected points relative to the plane. The method may additionally include determining, by the computing device, values for the digital entries, where a value for a digital entry corresponding to a particular point comprises an accumulation of distances from detected depth points along one or more of the rays that cross the particular point. The method may further include determining, by the computing device, a digital height map representative of heights of the at least one surface in the environment relative to the plane, where the heights of the at least one surface at particular locations in the digital height map are determined based on points where the values for the digital entries cross zero.

In a further example, a non-transitory computer readable medium having stored thereon instructions that, upon execution by a computing device, cause the computing device to perform functions is disclosed. The functions may include receiving, from at least one depth sensor, a plurality of detected depth points indicative of depths of at least one surface within an environment along rays from the at least one depth sensor. The functions may further include determining a projection of the plurality of detected depth points onto a plane within the environment. The functions may also include identifying a plurality of first detected points from the plurality of detected depth points, where a first detected point comprises a first point at a particular location of the plane in the projection. The functions may also include storing digital entries corresponding to points located within a threshold buffer from one of the first detected points relative to the plane. The functions may additionally include determining values for the digital entries, where a value for a digital entry corresponding to a particular point comprises an accumulation of distances from detected depth points along one or more of the rays that cross the particular point. The functions may further include determining a digital height map representative of heights of the at least one surface in the environment relative to the plane, where the heights of the at least one surface at particular locations in the digital height map are determined based on points where the values for the digital entries cross zero.

In another example, a system is disclosed including at least one depth sensor and a control system. The control system may be configured to receive, from at least one depth sensor, a plurality of detected depth points indicative of depths of at least one surface within an environment along rays from the at least one depth sensor. The control system may also be configured to determine a projection of the plurality of detected depth points onto a plane within the environment. The control system may be further configured to identify a plurality of first detected points from the plurality of detected depth points, where a first detected point comprises a first point at a particular location of the plane in the projection. The control system may additionally be configured to store digital entries corresponding to points located within a threshold buffer from one of the first detected points relative to the plane. The control system may be further configured to determine values for the digital entries, where a value for a digital entry corresponding to a particular point comprises an accumulation of distances from detected depth points along one or more of the rays that cross the particular point. The control system may also be configured to determine a digital height map representative of heights of the at least one surface in the environment relative to the plane, where the heights of the at least one surface at particular locations in the digital height map are determined based on points where the values for the digital entries cross zero.

In yet another example, a system may include means for receiving, from at least one depth sensor, a plurality of detected depth points indicative of depths of at least one surface within an environment along rays from the at least one depth sensor. The system may further include means for determining a projection of the plurality of detected depth points onto a plane within the environment. The system may also include means for identifying a plurality of first detected points from the plurality of detected depth points, where a first detected point comprises a first point at a particular location of the plane in the projection. The system may also include means for storing digital entries corresponding to points located within a threshold buffer from one of the first detected points relative to the plane. The system may additionally include means for determining values for the digital entries, where a value for a digital entry corresponding to a particular point comprises an accumulation of distances from detected depth points along one or more of the rays that cross the particular point. The system may further include means for determining a digital height map representative of heights of the at least one surface in the environment relative to the plane, where the heights of the at least one surface at particular locations in the digital height map are determined based on points where the values for the digital entries cross zero.

The foregoing summary is illustrative only and is not intended to be in any way limiting. In addition to the illustrative aspects, embodiments, and features described above, further aspects, embodiments, and features will become apparent by reference to the figures and the following detailed description and the accompanying drawings.

BRIEF DESCRIPTION OF THE DRAWINGS

FIG. 1A shows a robotic arm mounted on a moveable cart, according to an example embodiment.

DETAILED DESCRIPTION

Figure 1B:
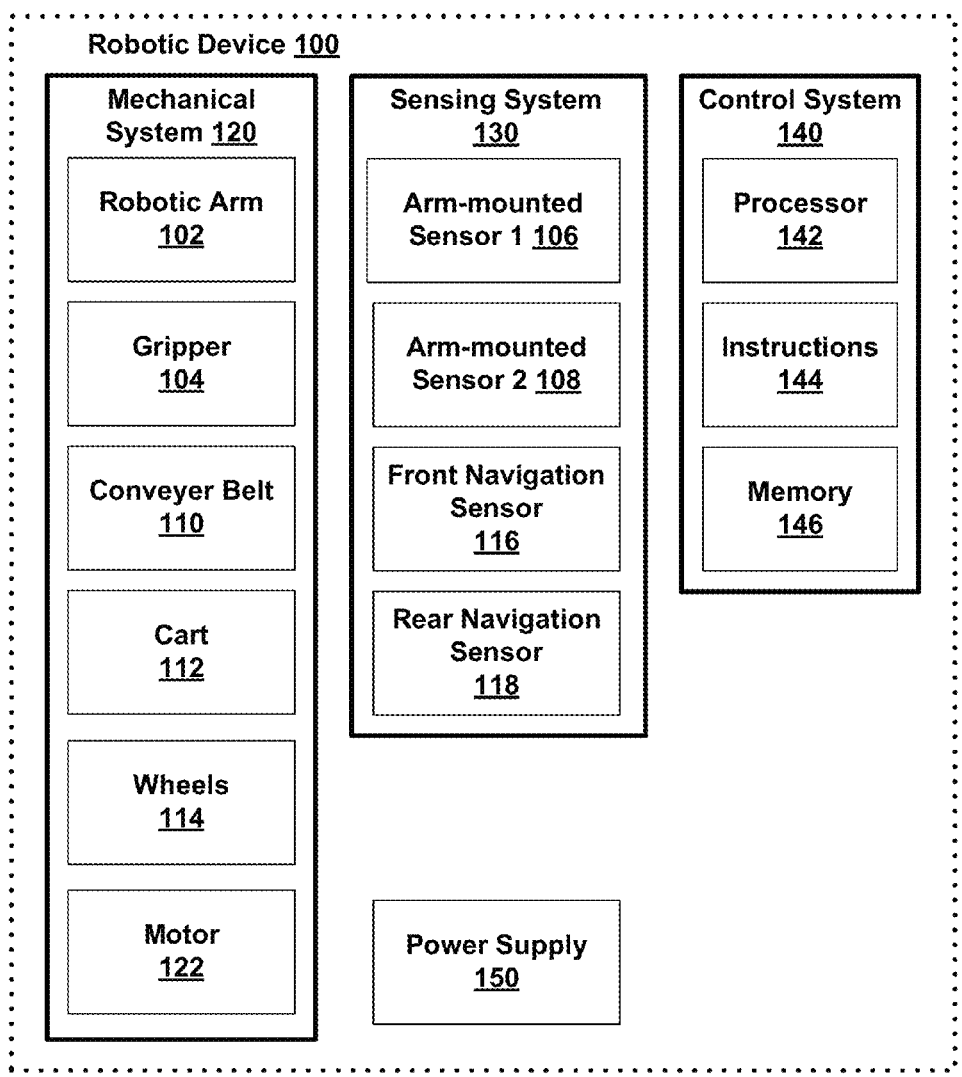
FIG. 1B is a functional block diagram illustrating a robotic device, according to an example embodiment.

Example methods and systems are described herein. Any example embodiment or feature described herein is not necessarily to be construed as preferred or advantageous over other embodiments or features. The example embodiments described herein are not meant to be limiting. It will be readily understood that certain aspects of the disclosed systems and methods can be arranged and combined in a wide variety of different configurations, all of which are contemplated herein.

Furthermore, the particular arrangements shown in the Figures should not be viewed as limiting. It should be understood that other embodiments might include more or less of each element shown in a given Figure. Further, some of the illustrated elements may be combined or omitted. Yet further, an example embodiment may include elements that are not illustrated in the Figures.

Example embodiments may help to determine a digital reconstruction of an environment, such as an environment of a robotic device. More specifically, multiple camera images from one or more different optical sensors may be combined to determine depth of surfaces or objects within the environment. In some examples, the optical sensors may include one or more three-dimensional depth sensors capable of detecting depths of points within the environment (e.g., distances from the optical sensors to detected objects). In further examples, the optical sensors may include one or more two-dimensional sensors capable of capturing two-dimensional visual images of portions of the environment as well or instead. Within examples, multiple camera images may be integrated to determine a virtual representation of the environment with higher resolution and/or to produce a larger field of view.

In some examples, a height map may be determined representing heights of one or more surfaces within the environment. For instance, the height map may be determined by orthographically projecting three-dimensional Cartesian coordinates from a three-dimensional representation of surfaces within an environment onto a plane. In some examples, the height map may be determined relative to a ground floor, a ceiling, or a side wall. In other examples, other types of projection may be used instead of orthographic projection onto a plane, such as pinhole projection or projection onto a different surface such as a sphere or a cylinder.

Example methods may facilitate integration of multiple depth images of an environment to produce a height map. More specifically, detected depth points may be received from one or more depth sensors. The depth points may then be projected onto a plane within the environment (e.g., the ground floor). Detected points identified as first points at particular locations on the plane in the projection may then be used to determine which locations to accumulate values for determination of a height map. In particular, digital entries may be created for points along a column within a threshold distance or buffer from a first detected point (e.g., 2 pixels above and 2 pixels below the detected point) relative to the plane within the environment.

In further examples, values for the digital entries may then be determined based on information received from one or more depth sensors. More specifically, a value for an entry corresponding to a particular point (e.g., a point with particular X, Y, Z coordinates) may be determined by accumulating distances to the point along rays to detected depth points. In particular, a ray from one of the depth sensors to a detected depth point that crosses one or more points for which digital entries have been created may contribute distance values for those digital entries. In some examples, a truncated sign distance function (TSDF) may be used to accumulate values in a digital entry for rays passing through a particular point. An example of such a function may assign a value of zero to a detected depth point, increasing values along the ray in a direction towards the optical sensor, and decreasing values along the ray in a direction away from the optical sensor.

In additional examples, the accumulated values within the digital entries may be used to determine a height map of one or more surfaces in the environment by identifying zero crossings within the digital entries. For instance, in considering a particular column of digital entries relative to the plane within the environment, an entry in the column with a value equal to or closest to zero may be identified as a height of a surface at the particular location to include within a height map of the environment.

In further examples, points at which rays cross over a particular location relative to the plane that do not fall within a threshold distance from a first detected point may be disregarded. In some examples, storage and/or computational savings may be achieved by only accumulating values for entries corresponding to points located within the threshold buffer from a first detected point.

In additional examples, a detected point that projects to the same location on the plane as a first detected point and is further away from the first detected point than a threshold distance may be used to determine a second column of digital entries. In particular, values may be accumulated for digital entries corresponding to points within the threshold buffer along either the first column of digital entries or the second column of digital entries. In further examples, more than two columns of digital entries may be created for locations in the projection as well.

In some examples, two separate columns of entries corresponding to a particular location in the projection may be used to identify an occluded edge of an object within the environment. For instance, points detected at an edge of an object and points that fall off the edge of the object may be projected to the same location on the plane (e.g., due to imperfect sensor resolution). In other examples, two separate columns of entries corresponding to a particular location in the projection may be used to identify a first object that occludes a second object in the environment (e.g., relative to the ground floor) as well or instead.

In further examples, the height map may be used to identify depth, location, size, shape, and/or other characteristics of one or more objects within the environment. For instance, a robotic device (e.g., a robot arm with one or more optical sensors coupled to the robot arm) may identify locations of objects based on the height map, and may then select one or more objects to pick up and/or move within the environment.

Reference will now be made in detail to various embodiments, examples of which are illustrated in the accompanying drawings. In the following detailed description, numerous specific details are set forth in order to provide a thorough understanding of the present disclosure and the described embodiments. However, the present disclosure may be practiced without these specific details. In other instances, well-known methods, procedures, components, and circuits have not been described in detail so as not to unnecessarily obscure aspects of the embodiments.

According to various embodiments, described herein are methods and systems for automated loading and/or unloading of boxes and/or other objects, such as into a storage container or from a vehicle. In some example embodiments, boxes or objects may be automatically organized and placed onto pallets. Within examples, automating the process of loading/unloading trucks and/or the process of creating pallets from objects for easier storage and transport may provide a number of industrial and business advantages.

According to various embodiments, automating the process of loading/unloading trucks and/or the process of creating pallets may include the incorporation of one or more robotic devices to move objects or perform other functions. In some embodiments, a robotic device can be made mobile by coupling with a wheeled base, a holonomic base (e.g., a base that can move in any direction), or rails on the ceiling, walls or floors. In some embodiments, the base can be an elevated base.

In some examples, a system including one or more sensors, one or more computers, and one or more robotic arms is described. The sensors may scan an environment containing one or more objects in order to capture visual data and/or three-dimensional (3D) depth information. Data from the scans may then be integrated into a representation of larger areas in order to provide digital environment reconstruction. In additional examples, the reconstructed environment may then be used for identifying objects to pick up, determining pick positions for objects, and/or planning collision-free trajectories for the one or more robotic arms and/or a mobile base.

As used herein, the term "boxes" will refer to any object or item that can be placed onto a pallet or loaded onto or unloaded from a truck or container. For example, in addition to rectangular solids, "boxes" can refer to cans, drums, tires or any other "simple" shaped geometric items. Additionally, "loading" and "unloading" can each be used to imply the other. For example, if an example describes a method for loading a truck, it is to be understood that substantially the same method can also be used for unloading the truck as well. As used herein, "palletizing" refers to loading boxes onto a pallet and stacking or arranging the boxes in a way such that the boxes on the pallet can be stored or transported on the pallet. In addition, the terms "palletizing" and "depalletizing" can each be used to imply the other.

Of course, examples herein may be applied toward objects other than boxes as well, and toward objects of various sizes and shapes.

According to various embodiments, a robotic manipulator may be mounted on a holonomic cart (e.g., a cart with wheels that allow the cart to move in any direction). FIG. 1A depicts an exemplary holonomic cart containing a robotic manipulator. In some embodiments, a moveable cart 112 may include a robotic arm 102 mounted on the cart 112. The robotic arm 102 may contain a gripping component 104 for gripping objects within the environment. The cart may contain one or more wheels 114, which may be holonomic wheels that operate with two degrees of freedom. In further embodiments, a wrap around front conveyor belt 110 may be included on the holonomic cart 112. In some examples, the wrap around front conveyer belt may allow the robot to not have to rotate its gripper to the left or right when unloading or loading boxes from or to a truck container or pallet.

In other examples, the robotic manipulator may be mounted on a different type of movable apparatus or may not be mounted on a movable base at all. For example, the robotic manipulator may be mounted at a fixed position within a factory setting. In other example embodiments, one or more robotic manipulators may be mounted on rails of a truck or container. In such examples, the robotic manipulators may be used to load or unload the truck or container.

FIG. 1B is a functional block diagram illustrating a robotic device 100, according to an example embodiment. The robotic device 100 could include various subsystems such as a mechanical system 120, a sensing system 130, a control system 140, as well as a power supply 150. The robotic device 100 may include more or fewer subsystems and each subsystem could include multiple elements. Further, each of the subsystems and elements of robotic device 100 could be interconnected. Thus, one or more of the described functions of the robotic device 100 may be divided up into additional functional or physical components, or combined into fewer functional or physical components. In some further examples, additional functional and/or physical components may be added to the examples illustrated by FIGS. 1A and 1B.

The mechanical system 120 may include components described above with respect to FIG. 1A, including a robotic arm 102, a gripper 104, a conveyer belt 110, a (movable or holonomic) cart 112, and one or more wheels 114. The mechanical system 120 may additionally include a motor 122, which may be an electric motor powered by electrical power, or may be powered by a number of different energy sources, such as a gas-based fuel or solar power. Additionally, motor 122 may be configured to receive power from power supply 150. The power supply 150 may provide power to various components of robotic device 100 and could represent, for example, a rechargeable lithium-ion or lead-acid battery. In an example embodiment, one or more banks of such batteries could be configured to provide electrical power. Other power supply materials and types are also possible.

The sensing system 130 may use one or more sensors attached to a robotic arm 102, such as sensor 106 and sensor 108, which may be 2D sensors and/or 3D depth sensors that sense information about the environment as the robotic arm 102 moves. The sensing system may determine information about the environment that can be used by control system 140 (e.g., a computer running motion planning software) to pick and move boxes efficiently. The control system 140 could be located on the device or could be in remote communication with the device. In further examples, scans from one or more 2D or 3D sensors with fixed mounts on a mobile base, such as a front navigation sensor 116 and a rear navigation sensor 118, and one or more sensors mounted on a robotic arm, such as sensor 106 and sensor 108, may be integrated to build up a digital model of the environment, including the sides, floor, ceiling, and/or front wall of a truck or other container. Using this information, the control system 140 may cause the mobile base to navigate into a position for unloading or loading.

In additional examples, planar surface information may be extracted from 3D sensors to model walls, floor and/or box faces. After modeling the floor, projection of objects onto the floor plane may enable segmentation of obstacles and/or target objects such as boxes. Floor-plane projection can also be used to model the corrugated sides of a container or truck, which may not be accurately modeled as planes. In further examples, sidewall angles, floor plane roll and pitch, and/or distance from side walls can be used to maneuver a mobile base into a container without collisions. Use of extended 3D information rather than a single line scan may help make the extraction of navigation information robust. For example, the side walls may have a vertical extent that is captured by the 3D sensor. Scanning systems that use a single line of depth information may be slower if they scan vertically and/or less robust because they acquire less information. In additional examples, front plane modeling can determine the distance to a next group of objects to pick in truck unloading.

In further examples, the robotic arm 102 may be equipped with a gripper 104, such as a digital suction grid gripper. In such embodiments, the gripper may include one or more suction valves that can be turned on or off either by remote sensing, or single point distance measurement and/or by detecting whether suction is achieved. In additional examples, the digital suction grid gripper may include an articulated extension. In some embodiments, the potential to actuate suction grippers with rheological fluids or powders may enable extra gripping on objects with high curvatures.

In some embodiments, the gripper could potentially span several boxes or objects and turn on suction for some or all of the covered objects. In some embodiments, the suction or adhesion devices may be a "digital" grid so that the robotic device can turn on any number of the suction devices as will fit boxes sensed for grabbing. In some implementations, the system may notice a seam in the boxes (separation between adjacent boxes) such that suckers can be activated on both sides of the seam to pick up both boxes at once, thereby doubling the throughput. In some embodiments, the suckers can sense after a certain amount time whether they can successfully grip a surface, after which they may automatically shut off. In further embodiments, sections of the suckers can fold down to grasp the top of the boxes. For instance, grippers can initially start at full extension and then conform to the surface being gripped.

In further examples, the robotic arm can implement a wiggle movement to improve a suction grip. In additional embodiments, the robotic arm can wiggle a box side to side to help segment the box from its surroundings. In other embodiments, the arm can wiggle upon pick up of the box to avoid jostling other objects. In such embodiments, when trying to adhere to an object in order to pick it up using suction, the robotic arm may employ a wiggle motion in order to make a firm seal against the object. In further examples, the robotic arm may wiggle the object as the robotic arm is picking up the object so that the box can more gently break friction or overlap contact with other items. This may help avoid a situation where pulling the object up too directly or too quickly causes other items to be tossed into the air.

According to various embodiments, cardboard boxes can have concave, convex or otherwise rumpled faces that make it hard for a suction device to adhere to. Thus, wiggling the suction device as the device makes suction contact may enable a more reliable grip on cardboard boxes and other non-planar objects. In further examples, when first grabbing a box, a few center suction devices can be turned on and the arm can wiggle back and forth as it starts to pull the box out. This may break surface adhesion with other boxes and help to start to pull the box out. Once the box is at least partially pulled out, the box may then be segmented from the other boxes more easily. In some embodiments, wiggling while picking up an object in clutter may remove other objects from the picked up object, thereby preventing unwanted pick up of surrounding objects.

According to various embodiments, segmentation of items may be necessary for successful grasping. In some embodiments, a smooth surface patch may belong to two separate objects. In such instances, manipulator interaction with the objects may be used to perturb the scene to better segment the objects from each other. For motion separation, the natural or forced movement of objects on a conveyor, on a slide, moving in a tote, and/or actively jostled within a tote may be tracked by optical flow, parallax, or time delayed views to calculate stereo depth in order to enhance object segmentation.

In other examples, one or more of the sensors used by a sensing system may be a RGBaD (RGB+active Depth) color or monochrome camera registered to a depth sensing device that uses active vision techniques such as projecting a pattern into a scene to enable depth triangulation between the camera or cameras and the known offset pattern projector. This type of sensor data may help enable robust segmentation. According to various embodiments, cues such as barcodes, texture coherence, color, 3D surface properties, or printed text on the surface may also be used to identify an object and/or find its pose in order to know where and/or how to place the object (e.g., fitting the object into a fixture receptacle). In some embodiments, shadow or texture differences may be employed to segment objects as well.

Many or all of the functions of robotic device 100 could be controlled by control system 140. Control system 140 may include at least one processor 142 (which could include at least one microprocessor) that executes instructions 144 stored in a non-transitory computer readable medium, such as the memory 146. The control system 140 may also represent a plurality of computing devices that may serve to control individual components or subsystems of the robotic device 100 in a distributed fashion.

In some embodiments, memory 146 may contain instructions 144 (e.g., program logic) executable by the processor 142 to execute various functions of robotic device 100, including those described above in connection with FIGS. 1A-1B. Memory 146 may contain additional instructions as well, including instructions to transmit data to, receive data from, interact with, and/or control one or more of the mechanical system 120, the sensor system 130, and/or the control system 140.

Figure 2A:
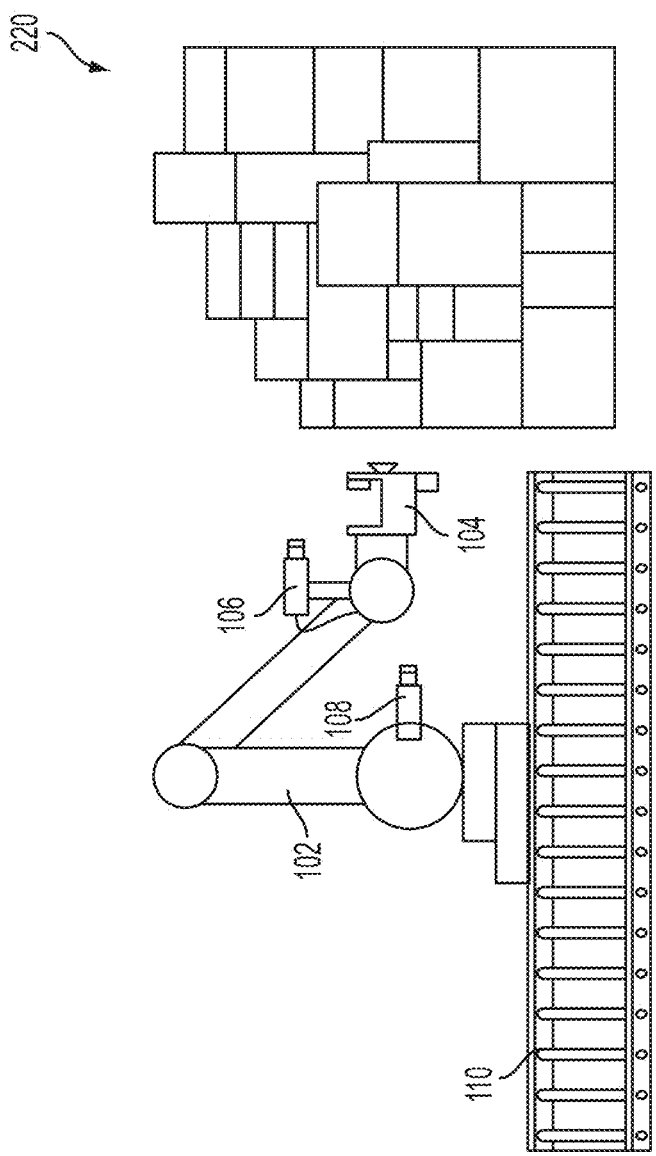
FIG. 2A shows a robotic arm and a stack of boxes, according to an example embodiment.

According to various embodiments, a perception-guided robot is described. For instance, a robotic device may utilize a combination of perception together with planning to guide the robot arm to pick up a box and place it where it needs to go. FIG. 2A illustrates part of the robotic device from FIG. 1A with a stack of boxes, according to an example embodiment. As shown, the robotic device may include a robotic arm 102 with a gripping component 104, sensors 106 and 108, and conveyer 110 as described above. In some examples, the robotic device could be mounted on a holonomic cart as described with respect to FIG. 1A, could be mounted on a different type of movable apparatus, could be mounted on rails or tracks, or could be stationary. The robotic device may be controlled to pick boxes from a stack of boxes 220 containing a heterogenous mix of shapes and sizes of boxes.

Figure 2B:
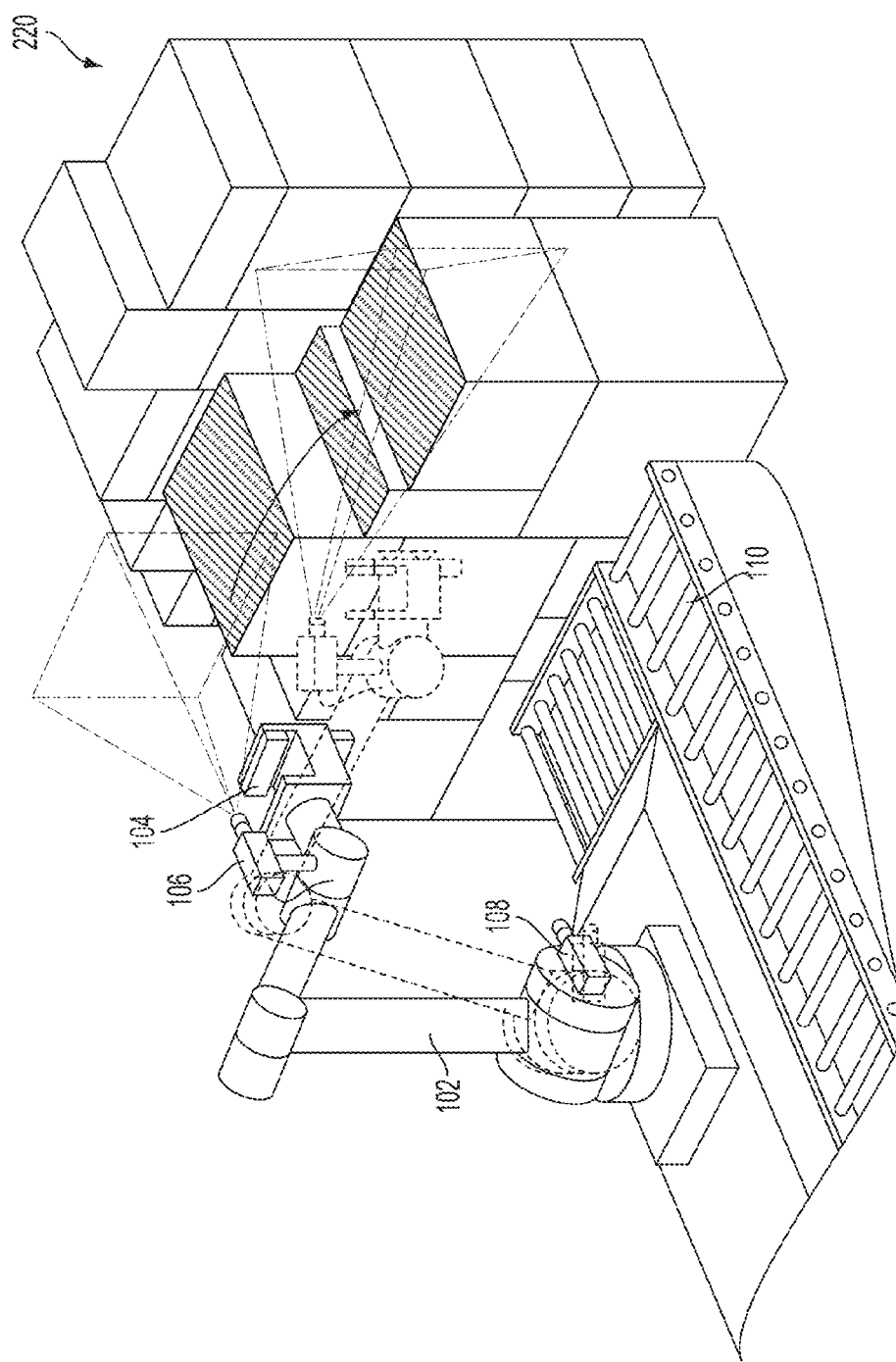
FIG. 2B shows scanning of the stack of boxes from FIG. 2A by a sensor mounted on the robotic arm, according to an example embodiment.

Within examples, a virtual environment including a model of the objects in 2D and/or 3D may be determined and used to develop a plan or strategy for picking up the boxes. In some examples, the robot may use one or more sensors to scan an environment containing objects, as shown in FIG. 2B. As the robotic arm 102 moves, a sensor 106 on the arm may capture sensor data about the stack of boxes 220 in order to determine shapes and/or positions of individual boxes. In additional examples, a larger picture of a 3D environment may be built up by integrating information from individual (e.g., 3D) scans. Sensors performing these scans may be placed in fixed positions, on a robotic arm, and/or in other locations. According to various embodiments, scans may be constructed and used in accordance with any or all of a number of different techniques.

In some examples, scans can be made by moving a robotic arm upon which one or more 3D sensors are mounted. Feedback from the arm position may provide pose information about where the sensor is positioned and may be used to help with the integration. Alternately, or additionally, scans may be made using one or more 2D sensors, for instance by leveraging motion and tracking keypoints in the environment. In further examples, scans may be from fixed-mount cameras that have fields of view (FOVs) covering a given field. In additional examples, scans may be visually registered to help with fine pose estimation, potentially giving better integration results.

In further examples, a virtual environment may be built up using a 3D volumetric or surface model to integrate information (e.g., from different sensors). This may allow the system to operate within a larger environment, such as in cases where one sensor may be insufficient to cover a large environment.

Such techniques may also increase the level of detail captured, which may help the robotic device perform various tasks. In particular, integrating information can yield finer detail than from a single scan alone (e.g., by bringing down noise levels). This may make possible better object detection, surface picking, or other applications.

In further examples, wide-angle environment reconstruction may be performed by sensing an environment and extracting that information into a simplified geometric model of simple mathematical 3D geometric forms (e.g., planes, cylinders, cones, hemispheres, etc). In some instances, such techniques may make motion planning easier and/or may make violation of the models (e.g., collisions) easier to detect. Alternately, or additionally, such techniques may allow a parametric description to extend the environment. For instance, the ground may be treated as a plane that extends behind objects that occlude it.

In additional examples, planes or other mathematical surfaces in the environment may be extracted in 3D. These known "ideal" surface detections may be combined into a more accurate model of the environment. For instance, planes may be used to determine the full extents of walls (or mathematical description thereof) and other obstacles to avoid collisions and detect where objects of interest are. Also, mathematical representations of objects may be used to look for anomalies such as when person enters into an environment. Such events may violate the ideal model, which may make their detection easier.

In other examples, certain objects such as boxes may have simple planar form. For instance, a metal can may have a geometric form of a cylinder and a tire may have a geometric form of a torus. Example systems may leverage this trait of certain objects in order model them and/or determine how to motion plan for the objects. For instance, known templates of certain shapes can be used to refine detected features of objects within the environment that appear to match a particular shape.

In some examples, 2D and 3D information may be represented at least in part via one or more facades. A facade may be defined as a near-planar construct containing a set of objects, represented as a depth map (e.g., a 2D map of distances as the third dimension). Examples of facades may include the wall of boxes in a truck, the top of a pallet stack containing boxes or other objects, or the top of a bin of jumbled objects.

Figure 2C:
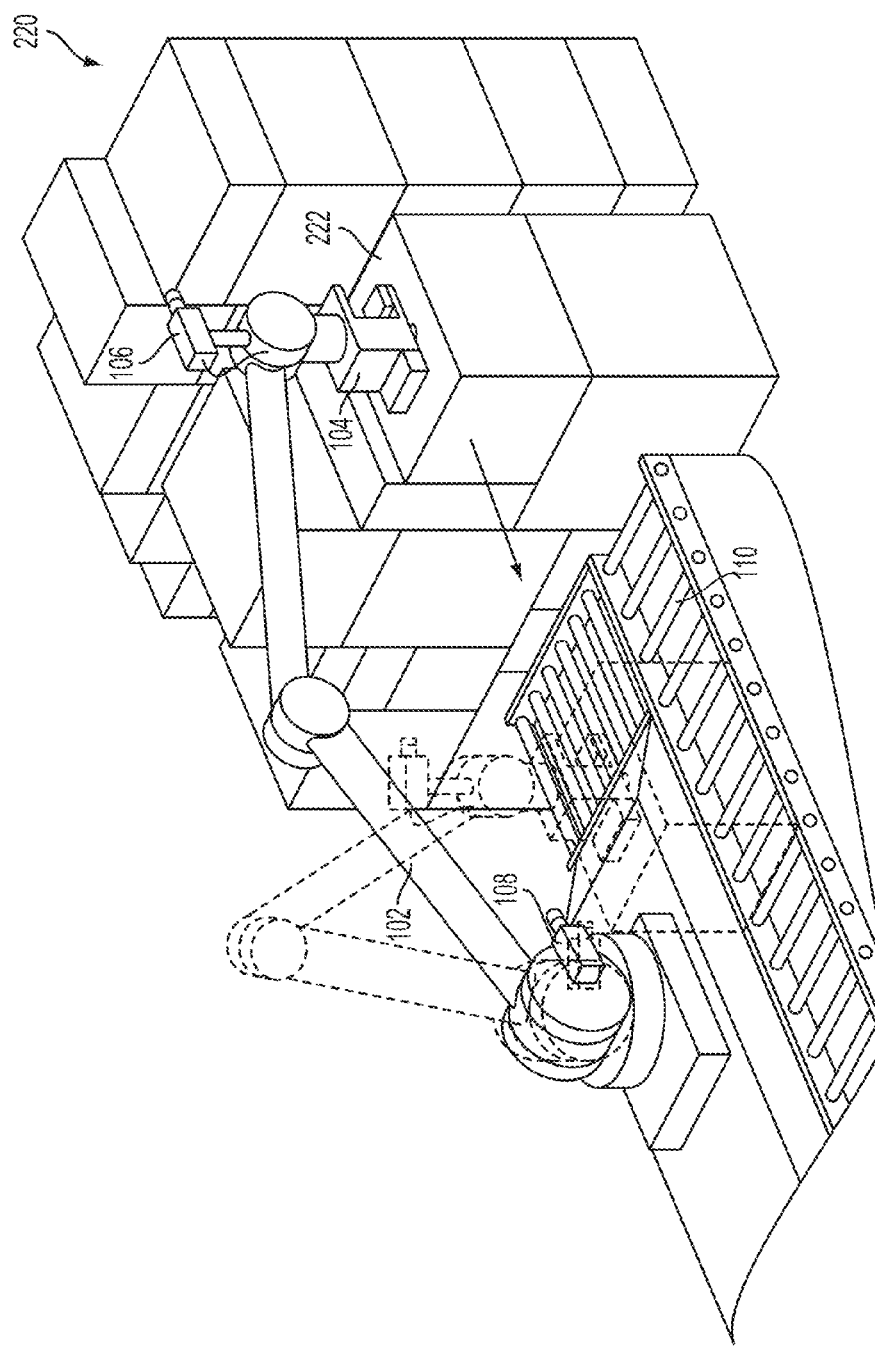
FIG. 2C shows the robotic arm from FIG. 2A moving a box, according to an example embodiment.

In further examples, a facade may be constructed from boxes, for instance to plan in what order the boxes should be picked up. For instance, as shown in FIG. 2C, box 222 may be identified by the robotic device as the next box to pick up. Box 222 may be identified within a facade representing a front wall of the stack of boxes 220 constructed based on sensor data collected by one or more sensors, such as sensor 106 and 108. A control system may then determine that box 222 is the next box to pick, possibly based on its shape and size, its position on top of the stack of boxes 220, and/or based on characteristics of a target container or location for the boxes. The robotic arm 102 may then be controlled to pick up the box 222 using gripper 104 and place the box 222 onto the conveyer belt 110 (e.g., to transport box 222 into a storage area).

In additional examples, a facade may be represented as an orthographic projection of 3D surface information. This representation may allow for parsing the facade to determine interesting areas for a particular application. For example, in truck unloading, the upper left corner of the next box to pick may be determined based on a facade representation. In other examples, an orthographic projection of integrated 3D environment may be determined to give a wide-FOV, easilyparsed representation for performing application-related tasks. One such task may be finding the corner or corners (e.g., top left) of a box to pick. Another such task may involve finding good surfaces (e.g., relatively flat and large) for picking objects out of a bin.

In further examples, a 3D model of a stack of boxes may be constructed and used as a model to help plan and track progress for loading/unloading boxes to/from a stack or pallet. Any one actual camera view of the facade may suffer from point of view occlusions and perspective distortion. Accordingly, multiple RGBD views via robot arm movements and/or different views from a cart base or fixed locations may be combine to create a single facade of the boxes to be picked.

In other examples, the 3D model may be used for collision avoidance. Within examples, planning a collision-free trajectory may involve determining the 3D location of objects and surfaces in the environment. A trajectory optimizer may make use of the 3D information provided by environment reconstruction to optimize paths in the presence of obstacles. In further examples, the optimizer may work in real time and may accept many kinds of constraints. As an example of such a constraint, the optimizer may attempt to keep the end effector level throughout the trajectory.

In additional examples, an environment may be captured as a mesh or set of 3D points. A robot arm may be represented as a convex hull of plane segments for quick collision checking. Constant or frequent updating of the environment may allow the robot arm to quickly respond to changes. In further examples, an optimizer may perform frequent continuous collision checking throughout its path. An optimizer may accept arbitrary constraints in the form of costs, such as to keep a certain distance away from objects or to approach a goal position from a given angle. Additionally, an optimizer may avoid robot fault conditions by working in joint space, keeping track of windup and choosing goal positions from among multiple inverse kinematics solutions. One strategy for motion planning may involve looking ahead several moves to see if the chosen goal joint position will be acceptable for the next move.

In some embodiments, path constraints, such as collision avoidance for robotic arms, cameras, cables, and/or other components, may be put in a constraint based planning solver and solved for to yield a best path to move the arm for perception. Additionally, in some embodiments, the solver may determine a best path for picking up, moving, and placing an object.

According to various embodiments, 3D and/or visual sensors may be calibrated to determine their pose with respect to the workspace. In the case of fixed sensors, the calibration may determine their fixed pose in the workspace. In the case of a sensor on the arm, calibration may determine the offset pose of the sensor from the arm link to which it is attached.

Within examples, calibration techniques may allow for the calibration of an arbitrary number of sensors in the workspace. Calibration may involve determining some or all of a variety of parameters and coefficients. For example, calibration may solve for one or more intrinsic parameters such as focal length and image center. As another example example, calibration may determine one or more distortion coefficients such as models of radial and tangential distortion. As yet another example, calibration may solve for one or more extrinsic parameters, where the object is in a scene relative to a pattern or other sensors that identified the same pattern in a scene.

In some examples, calibration may be performed at least in part by using a calibration pattern, which may be a known set of features in 2D or 3D. For instance, a known pattern of dots may be used, where the distance between each dot and the other dots is known. Calibration may be performed at least in part by collecting multiple different views of an object. In further examples, capturing multiple views of a calibration pattern in different positions may allow for (1) calibration of the one or more coefficients of the camera and/or (2) knowledge of where the camera is relative to the coordinate system established by where the calibration pattern was fixed. In particular embodiments, a camera in the scene may identify a calibration pattern on the robot arm while a camera on the arm identifies a calibration pattern in the scene simultaneously.

In additional examples, calibration may involve a camera fixed in a scene. In this case, a calibration pattern may be placed on a robotic arm. The robotic arm may be configured to move through the scene as multiple views of the calibration pattern on the robotic arm are collected. This may help to calibrate the camera and/or be useful for relating the coordinate system of the camera to that of the robot. Further, the relation of each device to the other can be determined by each device as the robotic arm moves.

In certain examples, calibration may involve a camera located on a robotic arm. A calibration pattern may be mounted on a wall or table. Then, the camera may be moved around, collecting multiple views of the calibration pattern from different robot or robotic arm positions. When different 3D or 2D views (e.g., 2, 20, 200) are collected, these views can be used to solve for the calibration relationships. After calibration, when the camera on the arm moves, the system can determine where it is relative to the coordinate system set based on the location of the calibration pattern in the scene. In particular embodiments, both the calibration pattern and the camera may be movable. For example, the calibration pattern may be located on a conveyor belt where the robotic arm may be configured to place boxes. After calibration, the system may determine where the camera was relative to that spot on the conveyor belt.

In further examples, nonlinear optimization may be performed in a two-stage process for robust estimation of 3D sensor calibration. In one stage, an initialization may be derived from the relative pose offsets of the target and the sensors. In another stage, given the initialization, a batch bundle adjustment may be used to find the optimal pose of the cameras together with the target points. Calibration can be extended to the estimation of robot parameters such as joint lengths and joint angle offsets.

In other examples, known, precise, robot motion of the camera over a calibration pattern, or a calibration pattern over a camera may be used to improve calibration results. For instance, information about precisely how the camera moves may be used to obtain more accurate camera calibration. That is, if the camera is moved 50 mm right, the corresponding (perspective projection) amount of movement from the calibration object may be detected. This information may be used to jointly or separately optimize the calibration and tracking parameters.

In additional examples, a robot can look at its ongoing calibration and move in such a way as to maximize information for better calibration. For example, it can detect that some view areas have not been seen and go to those views.

In further examples, a system for the practical manipulation of heterogeneous, categorical items, generally from a cluttered collection area to a defined bin, is presented. In some embodiments, the pick location containing the items may not be sensitive to precise object orientation(s) and items may be mixed together. In additional examples, the place location for the items may or may not be sensitive to object orientation. In some examples, the pick-and-place regions may be defined as 3D regions acceptable for picking or placing an object, with some tolerance. The pick-and-place region may be highly cluttered with similar and/or disparate objects. In other embodiments, the items may come from or be put into a fixture, such as metal or plastic snaps that hold the sorted item in a particular orientation.

In additional examples, environment modeling of both the pick-and-place location may be used for intelligent grasp location and motion, as well as event reporting (e.g., when a place region is full or a pick region is empty). In some examples, object bounding volumes may be computed and/or distinguishing features of objects may be found (such as textures, colors, barcodes or OCR). In some embodiments, objects may be sorted into an assigned destination location by matching against a database of location assignments indexed by object type or object ID. For instance, an object's locations may be derived from reading a barcode, considering the size of the object, and/or by recognizing a particular kind of object.

In some examples, a plan for a robotic device may be determined in order to achieve certain configurations of the objects within a target location for the objects. For instance, the goals for loading/unloading or constructing/deconstructing pallets may be to achieve: 1) a dense packing with minimal air gaps in between boxes, and/or 2) a stable packing that won't easily collapse. In some embodiments, stability may require that, in general, heavy objects are on the bottom, and light objects are on top. In other examples, pallets may be created in order to avoid non-interlaced column stacks, column leans, or other characteristics of a bad stack.

In further examples, the pallet or truck/container may be loaded such that work by human operators in subsequent unloading processes is minimized. For instance, in some embodiments, items may be placed in last in, first out order such that, upon unpacking, the items needed first are on top, the items needed second are one layer down and so on. In other examples, the loading of pallets may be independent of how items flow towards the packing cells. Thus, according to some embodiments, the system can handle packages sent in random order or in an order known in advance. In addition, in some embodiments, systems may adapt to changes in the flow of items on the fly. In further examples, one or more boxes may be recorded and buffered by holding the boxes in a temporary storage area where their order can be changed along the way.

According to various embodiments, a 2D simulator and/or a 3D simulator may be utilized for truck or container loading/unloading or for pallet loading/unloading. In some examples, the state of a stack of boxes may be captured in the physical world and input into the simulator. In some embodiments, a variable size queue of boxes from one to all the boxes may be used by a simulator for finding a next box to pick. For example, a queue of 2 boxes or 4 boxes or 10 boxes may be considered by a simulator.

In further examples, the simulator may search over the boxes in the queue to find the best box placement by heuristic algorithms and/or by brute force or multi-resolution search. In some embodiments, the system may increment with increasingly fine placement of boxes around the best sites found in the previously coarser level. In some embodiments, once placement of particular next box has been determined, a physics planner may be used for motion planning in order to move the box efficiently to the determined locations. In further examples, the physical and simulated stacks may be continuously monitored for quality of the stack (e.g., density, stability, and/or order placement). In some examples, the process may be repeated until all the boxes have been placed or the target container can no longer fit in another box.

Exemplary embodiments may relate to reconstruction of various types of virtual environments, including two-dimensional (2D) and/or three-dimensional (3D) virtual environments, using depth and/or visual data received from one or more optical sensors. Such environments may be represented, for example, as point representations, surface representations, or volumetric representations. In one particular example, the computing device may implement a volumetric system, such as a Truncated Signed Distance Function (TSDF), which may allow for integration of depth images to reduce noise and/or provide a wider field of view. Generally, the volume may be a virtual reconstruction of the environment in the form of a TSDF, which comprises implicit information about the surfaces present in the volume.

In some examples of volume integration, a TSDF volume comprises a regular 3D grid containing a signed scalar field indicating the distance to the nearest depth point. For each depth pixel in an input image, a projected ray may be averaged into the volume, with a zero value in the cell exactly at the three-dimensional depth point, positive values closer to the camera, and negative values further away from the camera. In further examples, the computing device may integrate together successive depth images that are registered to this volume.

In additional examples, the computing device may add information from a visual camera as well, in addition to the depth information, as noted above. To facilitate this, the visual camera may be calibrated in accordance with the depth camera, and the depth image may be re-projected to the frame of the visual camera so that their images correspond to the same (visual camera) viewpoint. Then, at each point in the volume along a projected ray, visual RGB information may also be averaged into the volume cells along the ray.

As a further example aspect of volume integration, the computing device may take into account a confidence in the depth reading. For instance, readings that are further away from the camera, or that strike a surface at a glancing angle, may be discounted by the computing device. As such, more confident information may have more of an effect during integration, which may improve the quality of the environment reconstruction.

In some aspects, the computing device may also subtract information, for example, when a box is removed or the environment changes for any other reason, and when new information contradicts the old information. Examples involving TSDF may handle situations such as this by gradually averaging in the new information, which can take a significant number of new views before older, invalid surfaces are removed. To facilitate quick removal of information, the computing device may implement one or more processes.

In one example, the computing device may have predetermined that it will be loading, unloading, or otherwise interacting with an object such as a box. For instance, the computing device may know a region of the box (e.g., the coordinates and dimensions of the box), and may erase this region from the TSDF, setting the region to a zero state. This erasure may cause errors, and thus, the computing device may gradually smooth the outlines of the removed box.

In another example, the computing device may enforce a strong erasure constraint on each ray that is projected into the volume. Instead of just changing the TSDF in the vicinity of the 3D depth point, the computing device may zero out all cells along the ray, from the camera to a certain distance in front of the 3D depth point. Such a process may cause the environment to change much more rapidly in dynamic situations, without ruining the integration of areas that are stable. Other example methods for quickly removing information from images are possible as well.

In some scenarios, the computing device may need to extract either 3D points or explicit surface information as the input to other algorithms (e.g., obstacle avoidance applications). To facilitate this, the computing device may implement one or more of several different algorithms. For instance, the computing device may project the volume TSDF onto a planar surface in the form of a height map representative of heights of the volume relative to the planar surface at different points. In some examples, the height map may be an image whose pixel values represent the distance of the nearest surface along a ray perpendicular to the surface (for orthographic projection), or through a focal point (for pinhole projection).

In addition to the height map, the computing device can obtain a similar visual map by projection in cases where the TSDF includes RGBD values at each cell. Such a visual map may take the same format as the height map. Information in the height map may be color-coded by depth.

As a further example aspect of volume integration, each cell may also include information about whether that cell occurs at the edge of the projected depth and/or visual image. In a scenario where the computing device re-projects the volume to a height map, such information may be used to determine where there are "false edges" in the height map (i.e., edges that arise from the aperture edges of the input images).

In an example application of height maps, the computing device may determine the location of boxes in the physical environment. In some examples, every face of a rectangular-sided box may be a planar segment that projects onto an orthographic height map as a parallelogram Thus, in order for the computing device to find rectangular box faces, the computing device may look for parallelograms in the height map using one or more of example methods described herein (e.g., using line segments from both visual and depth height maps).

In another example application of height maps, the computing device may determine a suitable set of convex bodies to facilitate collision avoidance. In some examples, the computing device may perform convex decomposition in 2D space rather than in 3D space, although convex decomposition in 3D space is possible as well. For instance, an example algorithm may first subdivide the height map into a set of planar regions. Then, each planar region may be divided into a set of 2D convex shapes. Finally, all 2D convex regions may be extruded away from the projecting plane to create convex 3D bodies. Other example applications of height maps are possible as well.

Example methods may facilitate integration of multiple depth images to determine a digital height map of a portion of an environment. Such example methods may be used in conjunction with any of the described techniques for environment reconstruction, including various example implementations of TSDF for integration. In further examples, a resulting digital height map may be used for a variety of different applications.

Figure 3:
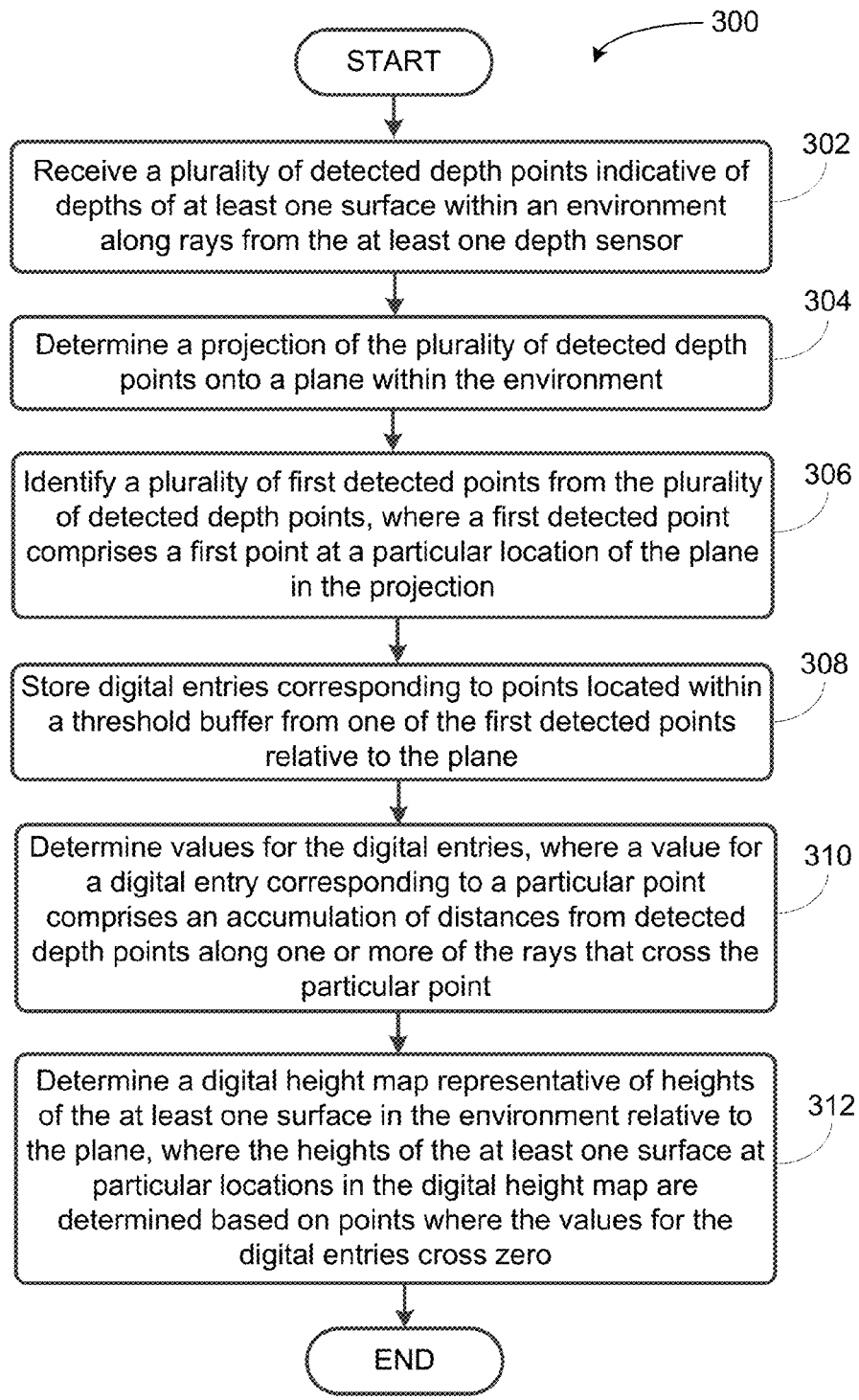
FIG. 3 illustrates a flowchart showing a method 300, according to an example embodiment.

FIG. 3 illustrates a flowchart showing a method 300 that may allow for determination of a digital height map representative of an environment, according to an example embodiment. Method 300 may be carried out using a variety of systems that may use information received from one or more depth sensors to virtually reconstruct an environment, including any robotic device described above, such as a device including a robotic arm mounted on a moveable cart with one or more sensors, as illustrated and described with respect to FIGS. 1A-1B. In other examples, method 300 may be carried out using a robotic manipulator mounted on a different type of movable apparatus, on a rail or track, or at a stationary location. In further examples, part or all of method 300 may be performed by one or more control systems located on a robotic device and/or in remote communication with a robotic device. Additionally, while examples with a single robotic arm may be described, various alternative embodiments may include any number of robotic arms, or may include other automated systems integrated with a robotic manipulator.

Furthermore, it is noted that the functionality described in connection with the flowcharts described herein can be implemented as special-function and/or configured general-function hardware modules, portions of program code executed by a processor for achieving specific logical functions, determinations, and/or steps described in connection with the flowchart shown in FIG. 3. Where used, program code can be stored on any type of computer-readable medium, for example, such as a storage device including a disk or hard drive.

In addition, each block of the flowchart shown in FIG. 3 may represent circuitry that is wired to perform the specific logical functions in the process. Unless specifically indicated, functions in the flowchart shown in FIG. 3 may be executed out of order from that shown or discussed, including substantially concurrent execution of separately described functions, or even in reverse order in some examples, depending on the functionality involved, so long as the overall functionality of the described method is maintained.

As shown by block 302 of FIG. 3, method 300 may involve receiving a plurality of detected depth points indicative of depths of at least surface within an environment. More specifically, one or more optical sensors may be positioned at one or more different points within an environment to collect depth measurements of portions of the environment. The sensors may include any optical sensors capable of providing depth information, including stereo sensors that identify corresponding features in images and/or sensor systems that use active pattern projection to enable depth triangulation. In some examples, data received from one or more 2D visual sensors may be used to determine or refine depth information indicative of depths of surfaces within the environment as well. In additional examples, one or more optical sensors may be configured to move within the environment to collect data from different viewpoints for depth estimation.

In further examples, depth information may be received from one or more depth sensors at different points in time. For instance, one or more sensors may be coupled to a robotic arm which moves within an environment. As sensors are moved into new positions or orientations, additional depth information and/or depth images may be captured which may provide different viewpoints of surfaces within the environment.

Figure 4A:
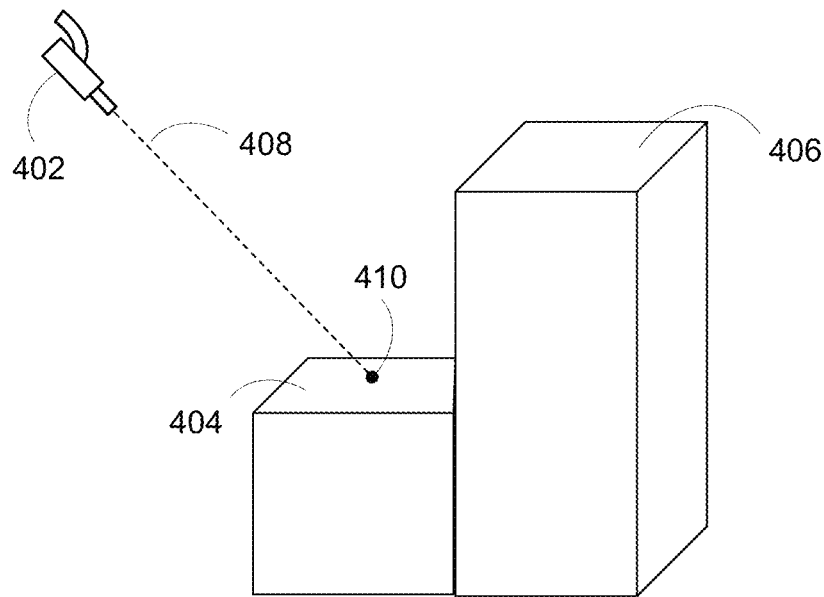
FIG. 4A illustrates a depth sensor and a detected depth point, according to an example embodiment.

FIG. 4A illustrates a depth sensor and a detected depth point, according to an example embodiment. More specifically, a depth sensor 402 may be oriented to capture depth information indicative of depth of one or more surfaces within an environment, such as depths of box faces 404, 406. The depth sensor 402 may collect depth information about points within the environment, such as point 410 on box face 404, which may be measured along a ray 408 from depth sensor 402 to point 410. The depth information about point 410 may include a distance to point 410 from depth sensor 402 and/or Cartesian coordinates of point 410 relative to a Cartesian frame positioned with the environment. In additional examples, multiple depth sensors may be calibrated such that depth information of detected depth points may be combined into a single frame of reference. For instance, positions and orientations of depth sensors may be determined and used to transform detected depth points to a single (X, Y, Z) coordinate system.

Referring back to FIG. 3, Method 300 may further involve determining a projection of the plurality of detected depth points onto a plane within the environment, as shown by block 304. More specifically, points may be projected onto a plane which may be chosen based on a particular desired view of objects within the environment. For instance, in order to determine heights of boxes on a top level of a stack of boxes, points may be projected onto a ground floor or onto the ceiling with the environment. In other examples, different planes such as a vertical wall may be used instead. In some examples, depth points may be projected onto the plane using orthographic projection. For instance, if an (X, Y, Z) Cartesian coordinate of a point is determined, the point may be projected onto a plane on the floor at the corresponding (X, Y) point. In other examples, different types of projection such as pinhole projection may be used to project points onto the plane. In further examples, points may in some instances be projected onto a surface other than a plane, such as a sphere or a cylinder.

Figure 4B:
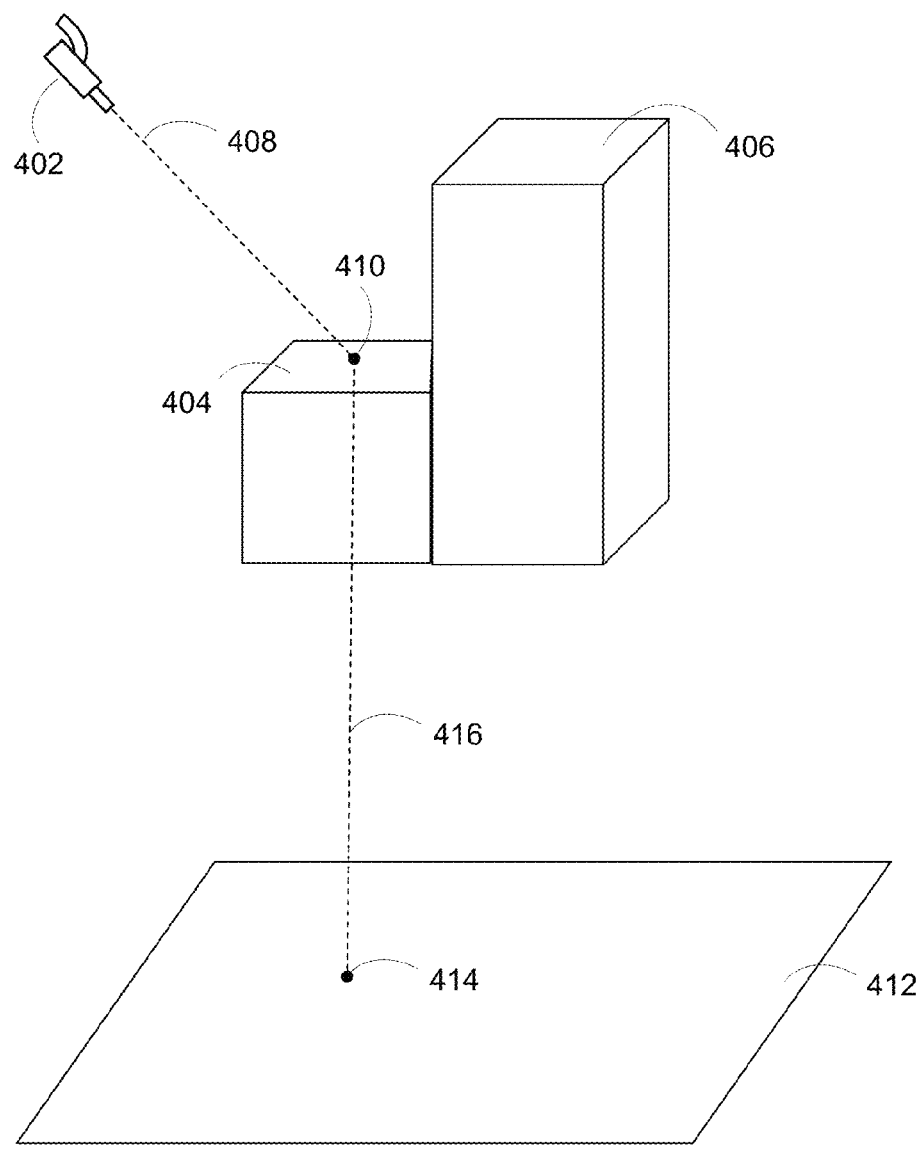
FIG. 4B illustrates projection of a detected depth point onto a plane, according to an example embodiment.

FIG. 4B illustrates projection of a detected depth point onto a plane, according to an example embodiment. More specifically, detected depth point 410 may be projected orthographically onto plane 412 by projecting point 410 along an orthogonal direction 416 to location 414 on plane 412. For instance, if detected depth point 410 is represented by an (X, Y, Z) Cartesian coordinate and the plane 412 is chosen to be a horizontal plane relative to a Cartesian frame fixed within the environment (e.g., the ground floor), then the location 414 of detected depth point 410 within plane 412 may be determined by selecting the X and Y coordinates from the depth point. In other examples, different planes may be used for the projection, including planes that may not be parallel to a chosen Cartesian frame.

Referring back to FIG. 3, Method 300 may further involve identifying a plurality of first detected points from the plurality of detected depth points, as shown by block 306. More specifically, first detected points may be the first points to be projected to particular locations within the plane. When another detected depth point is projected to the same location in the plane as a previously detected depth point, the detected depth point may not be identified as a first detected depth point.

For instance, in reference to FIG. 4B, if detected depth point 410 is the first detected point at location 414 after projection onto plane 412, then the detected depth point 410 may be identified as a first detected depth point. Conversely, if one or more previously detected depth points were projected onto location 414 within the plane 412, then the detected depth point 410 may not be identified as a first detected depth point. In some example, first detected depth points may only be identified for certain locations or certain portions of the plane 412.

Referring back to FIG. 3, Method 300 may additionally involve storing digital entries corresponding to points located within a threshold buffer from one of the first detected points relative to the plane, as shown by block 308. More specifically, digital entries may be created to enable accumulation of distances to detected depth points at particular points within the environment. The particular points for which digital entries are created may be chosen by comparing the threshold buffer to the distance of the particular points from a first detected depth point that projects to the same location on the plane within the environment.

In some examples, the threshold buffer may be chosen based in part on expected amounts of error in detected depth points. For instance, the buffer may be set to two pixels above and two pixels below a first detected depth point relative to the plane within the environment. In another example, when a less precise depth sensor is used, the buffer may be set to five pixels above and five pixels below a first detected depth point. In some examples, entries may be created for an equal number of points above and below a first detected point. In other examples, a greater number of entries may be created for points above a first detected point than for points below a first detected point, or vice versa. In further examples, different threshold buffers may be used for different groups of points or areas within the environment.

In certain examples, the digital entries for points within a threshold buffer of a first detected depth point may be stored linearly within memory. For instance, the points may be stored in a vector representative a particular column of points around a first detected point relative to the plane within the environment. In other examples, the digital entries may be stored in other ways and/or by using other types of data structures as well.

Figure 4C:
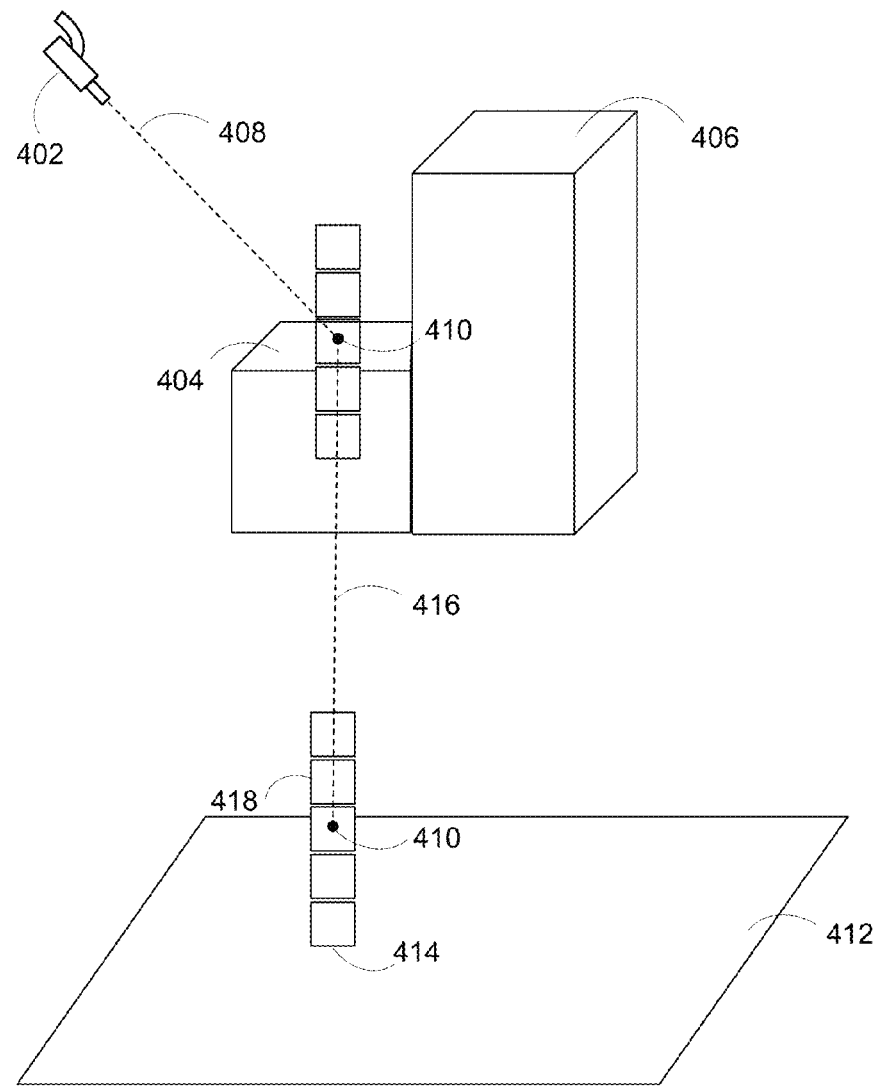
FIG. 4C illustrates digital entries for points within a threshold of a detected depth point, according to an example embodiment.

FIG. 4C illustrates digital entries for points within a threshold of a detected depth point, according to an example embodiment. More specifically, digital entries may be stored (e.g., within computer memory) corresponding to points located within a threshold buffer from a first detected point 410 relative to plane 412. For instance, in one example, the threshold buffer may be set to include points in the environment corresponding to two pixels above and two pixels below detected point 410, as shown by column 418, which may include an entry for the point 410 itself as well as two points above and two points below the point 410. In further examples, the column 418 may be stored with a reference from the location 414 on plane 412 that each of the points in the column 418 project onto. For instance, the digital entries may be stored as a matrix of locations on the plane, with some or all of the locations pointing to a particular column of entries.

Referring back to FIG. 3, Method 300 may additionally involve determining values for the digital entries, as shown by block 310. More specifically, a value for a digital entry corresponding to a particular point may be determined by accumulating distances from detected depth points along one or more of the rays that cross the particular point. The values may therefore accumulate many depth measurements from multiple directions and/or multiple depth sensors to determine a virtual representation of a portion of the environment.

In some examples, the values for the entries may be determined using any of a number of variations of TSDF. In particular, the values may be signed such that a value for a particular ray from a depth sensor is zero at a detected depth point, increases in a direction towards the depth sensor, and decreases in a direction away from the depth sensor. In additional examples, the values may be normalized relative to a predefined distance, such that the values may be ratios of signed distances from a detected depth point relative to the predefined distance. In further examples, the predefined distance may be set based on an expected amount of error or noise of one or more depth sensors (e.g., to 1 cm or 10 cm). In additional examples, values with magnitude greater than one after normalizing (e.g., when the distance to a detected depth point along a ray is greater than the predefined distance) may be truncated to maximum or minimum values (e.g., +1 or −1).

In further examples, as additional values are received (e.g., from rays passing through a particular point for which a digital entry has been created), the additional values may be averaged into the current value stored within a digital entry. For example, a weighted average may be used, which assigns equal weights to each value for a ray passing through the particular point. In other examples, different weights may be used instead. For instance, more recent values may be assigned a greater weight than values determined at some previous time. Values may be determined for the digital entries representing an accumulation of distances from detected depth points in other ways as well.

Figure 4D:
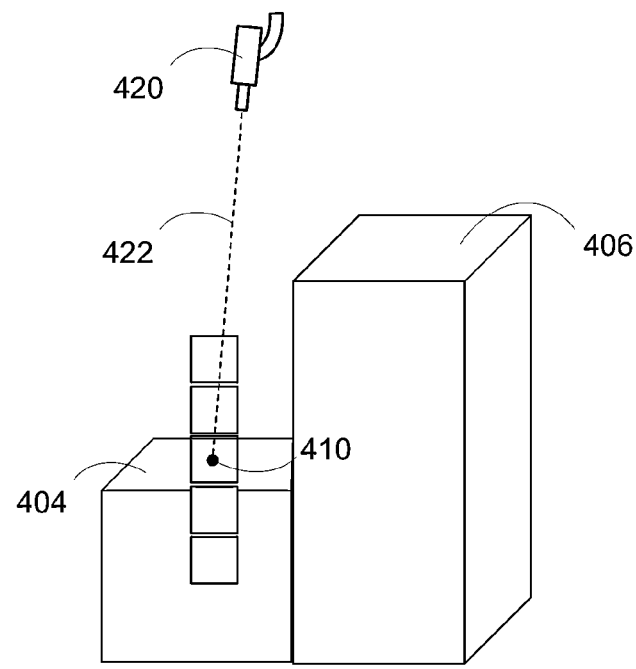
FIG. 4D illustrates distance values from a detected depth point, according to an example embodiment.
Figure 4D:
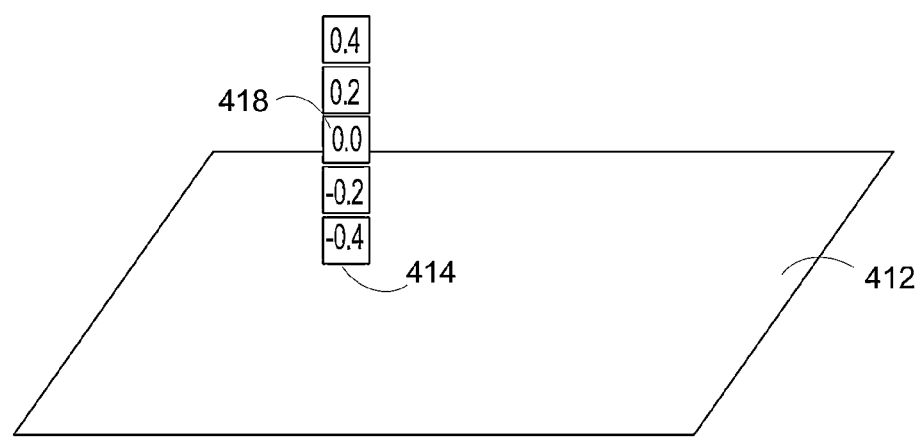

FIG. 4D illustrates distance values from a detected depth point, according to an example embodiment. More specifically, the column 418 of digital entries corresponding to points within a threshold buffer from detected point 410 may be used to accumulate distance values for rays which cross through one or more of the points. For instance, another depth sensor 420 may detect the depth of a detected depth point 410 along ray 422. The ray 422 may cross through each of the points corresponding to digital entries of column 418. Other rays from depth sensors (e.g., at different positions) may only cross through one or several of the points corresponding to digital entries of column 418 as well.

Values that indicate distance to detected depth point 410 may be determined for the ray 422 from depth sensor 420 at points corresponding to the digital entries of column 418. For instance, a value of zero may be used for the point 410, with increasing positive values in a direction toward optical sensor 420 and decreasing negative values in a direction away from optical sensor 420 along ray 422. In some examples, the values may also be normalized (e.g., relative to a predefined depth). In further examples, the values may also be truncated when they exceed a certain distance from the detected point (e.g., when a normalized value is greater than 1 or less than −1). As an illustrative example, values of 0.2 and 0.4 indicating absolute distance or normalized distance from the detected point 410 may be used for the entries of column 418 in a direction toward optical sensor 420. Additional values of −0.2 and −0.4 indicating absolute distance or normalized distance from the detected point 410 may be used for the entries of column 418 in a direction away from optical sensor 420.

In further examples, additional rays from one or more depth sensors to one or more detected depth points may cross over the location 414 in plane 412 (e.g., project to location 414 in plane 412). Some rays may cross through one or more of the points for which digital entries have been created in column 418. Values from such rays may be averaged into the accumulated value at particular digital entries (e.g., by using a weighted average).

Other rays may cross over the location 414 in plane 412 for which a digital entry has not been created (e.g., when the distance to detected point 410 is greater than the threshold distance). In some examples, a distance value for the ray at location 414 may not be factored into the accumulated value at such points. In further examples, the threshold distance may be chosen based on an expected amount of noise or an expected maximum amount of error so that digital entries can be expected to be created for entries where detectable surfaces exist along normals from the plane within the physical environment. Additionally, digital storage and/or computational savings may be obtained by restricting the digital storage to only points within a threshold distance from a first detected point relative to the plane.

Referring back to FIG. 3, Method 300 may additionally involve determining a digital height map representative of heights of the at least one surface in the environment relative to the plane, as shown by block 312. More specifically, heights of surfaces at particular locations in the digital height map may be determined based on points where the values for the digital entries cross zero. For instance, a zero crossing within each column of digital entries relative to the plane may be identified as a point on a detectable surface within the environment. In further examples, zero crossings may be identified as a digital entry with a value of zero, a digital entry with a value closest to zero, or values in two consecutive digital entries where the sign switches from positive to negative or from negative to positive.

Figure 4E:
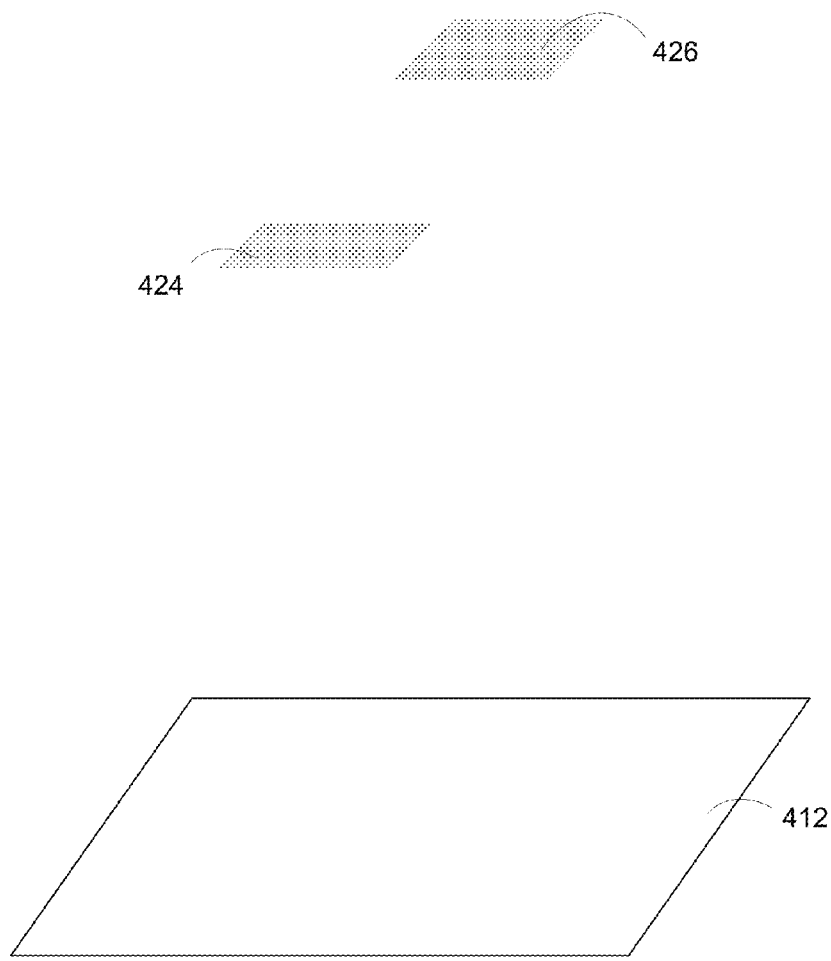
FIG. 4E illustrates a portion of a height map of surfaces in an environment, according to an example embodiment.

FIG. 4E illustrates a portion of a height map of surfaces in an environment, according to an example embodiment. More specifically, points on a first surface 424 of the height map may represent heights of detected points from the box surface 404 relative to plane 412. Additionally, points on a second surface 426 of the height map may represent heights of detected points from the box surface 406 relative to plane 412. In some examples, a height map may only contain height values for certain locations or sections of plane 412.

In further examples, a digital height map may be represented in a variety of ways. In one example, a height map may be represented as a matrix corresponding to locations of plane 412 with a corresponding height at each point indicating an orthogonal distance from the location on the plane 412 to a detectable surface within the environment. In further examples, a digital height map may be represented by an image whose pixel values represent the distance of the nearest surface along a ray perpendicular to the surface. In cases where a different type of projection than orthographic projection is used to determine the height map, the values in the height map (or the pixel values in the image) may represent other types of distances as well. For instance, when pinhole projection is used, the distances may represent distances of points on one or more detectable surfaces to the plane through a chosen focal point.

In additional examples, when a second point is detected that projects to the same location in the place as a first detected point and is further away from the first detected point than the threshold buffer, a second column of digital entries may be stored around the second detected point. More specifically, digital entries may be stored for points located within the threshold buffer from either the first detected point or the second detected point. Distance values may then be accumulated for the column of digital entries around the first detected point and also for the column of digital entries around the second detected point.

In further examples, the two columns of values may be used to determine the height map to represent multiple surfaces that project to the same location. In additional examples, a selection may be made between a zero crossing in the first column and a zero crossing in the second column based on which of two different surfaces is a surface of interest (e.g., a box to be picked). In other examples, a selection may be made between the two columns when one of the columns only contains points resulting from noise (e.g., sensor calibration error).

In additional examples, more than two columns of digital entries may be stored for particular locations in the projection as well. For instance, a third column column of digital entries may be stored around a third detected point that is not within the threshold buffer from either the first detected point or the second detected point at a certain location in the projection. In some examples, different numbers of digital columns may be stored for different locations or portions of the projection as well.

Figure 4F:
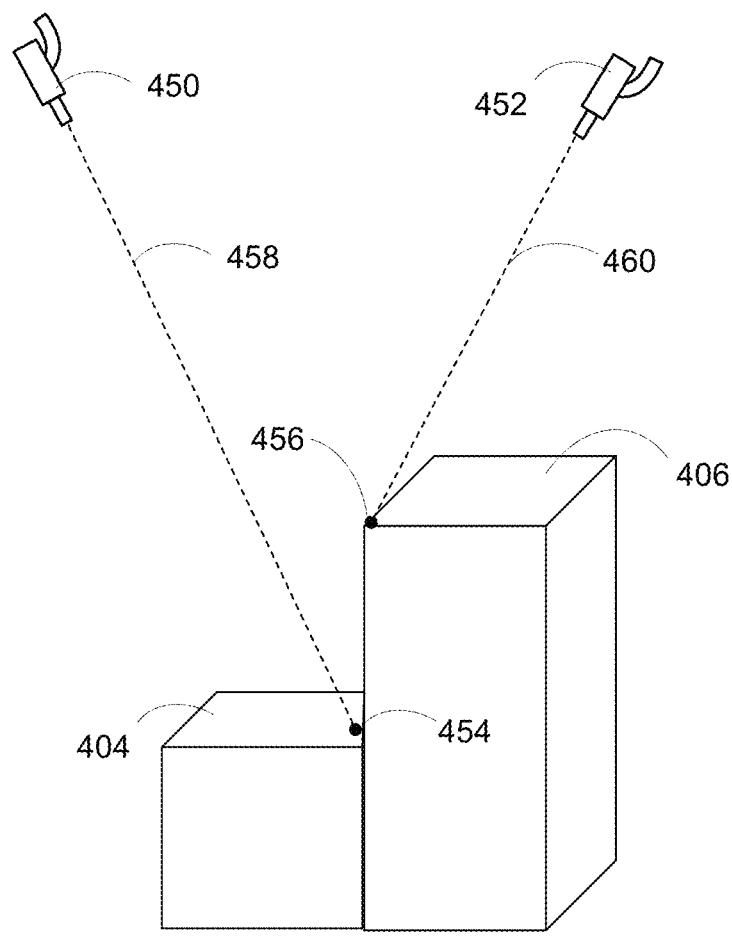
FIG. 4F illustrates two depth sensors and two detected depth points, according to an example embodiment.

FIG. 4F illustrates two depth sensors and two detected depth points, according to an example embodiment. More specifically, a first optical sensor 450 may detect the depth of a first detected depth point 454, which may be a point located on box surface 404 within the environment. The depth of point 454 may be determined based on a distance between the point 454 and optical sensor 450 along a ray 458 from optical sensor 450 to the point 454. Additionally, a second optical sensor 452 may detect the depth of a second detected depth point 456, which may be a point located on box surface 406 within the environment. The depth of point 456 may be determined based on a distance between the point 456 and optical sensor 452 along a ray 460 from optical sensor 452 to the point 456. In additional examples, the two detected depth points 454, 456 may be detected by a single moving sensor at different points in time (e.g., sensor 450 and 452 may represent two different positions of a single sensor).

Figure 4G:
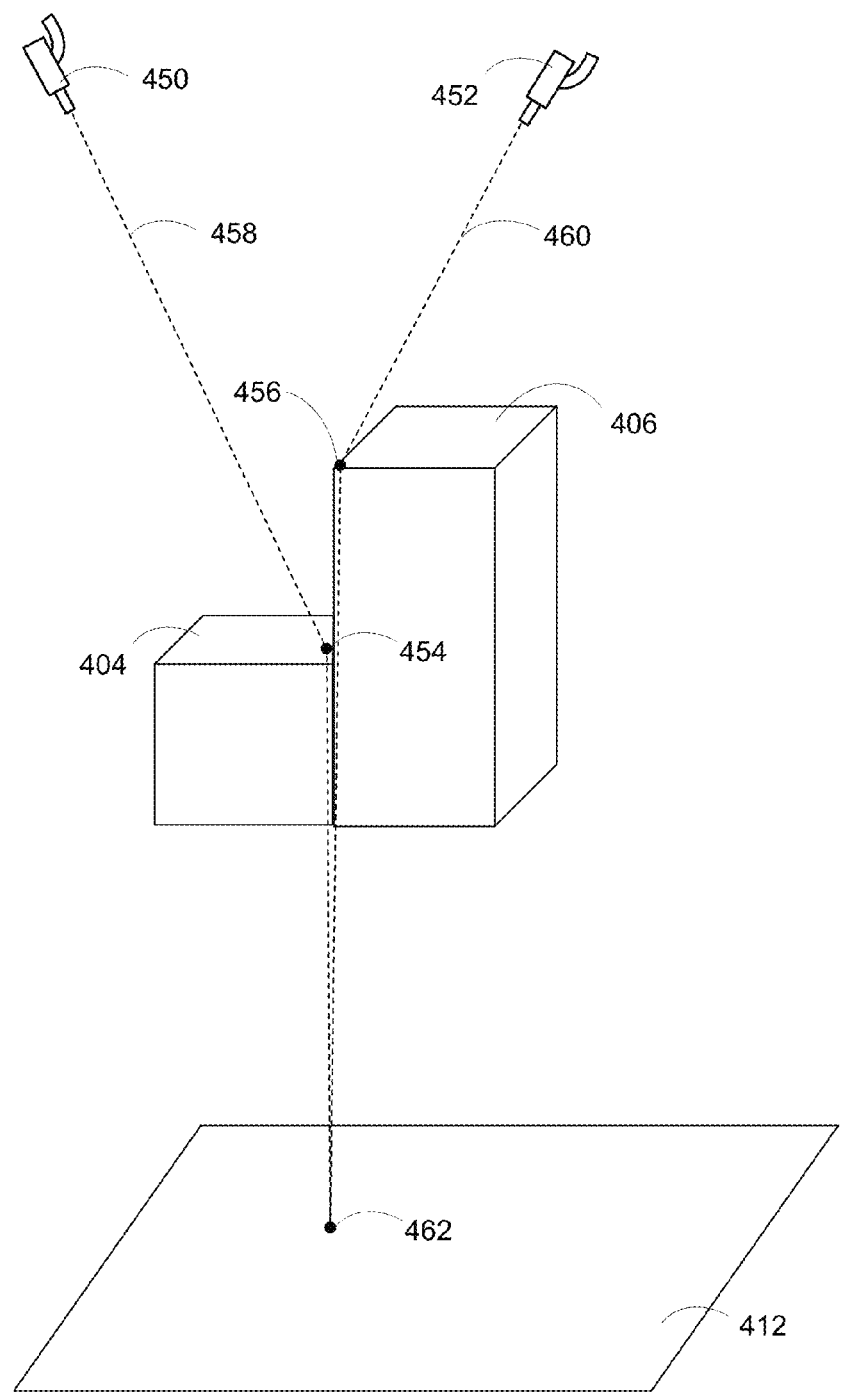
FIG. 4G illustrates projection of two detected depth points onto a plane, according to an example embodiment.

FIG. 4G illustrates projection of two detected depth points onto a plane, according to an example embodiment. More specifically, the first detected point 454 may be projected to a particular location 462 on a plane 412 within the environment (e.g., a plane representative of the ground floor). For instance, the first detected point 454 may be orthographically projected to location 462. Additionally, in an example scenario, the second detected point 456 may be projected to the same location 462 on the plane 412. Two points which are further apart than the threshold distance relative to the plane may therefore be projected to the same location when sensors may not have sufficient resolution and/or precision to identify the location of an occluded edge of an object, such as illustrated in FIG. 4G.

In additional examples, there may be detected depth points which are relatively far apart but are projected to the same location within a particular plane in the environment for other reasons. For instance, one object may occlude part or all of a second object relative to the plane. In such an example, one sensor may be oriented such that it detects points on the first object while a second sensor is oriented such that it detects points on the second object. In another example, some of the points which project to the same location may be the result of noise or errors in sensor calibration as well.

Figure 4H:
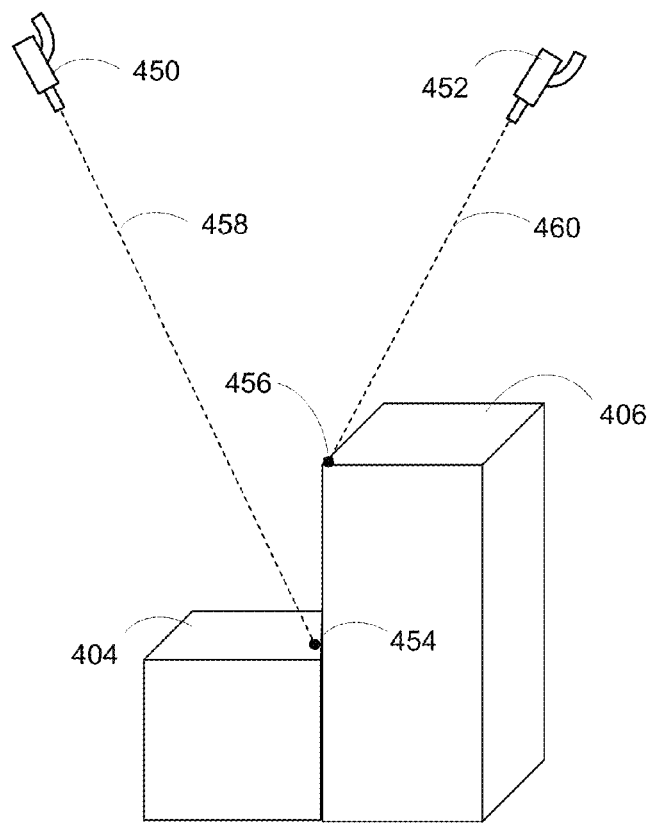
FIG. 4H illustrates digital entries for points within a threshold distance from two detected depth points, according to an example embodiment.
Figure 4H:
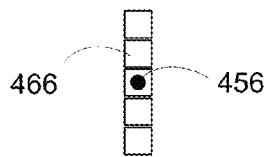
Figure 4H:
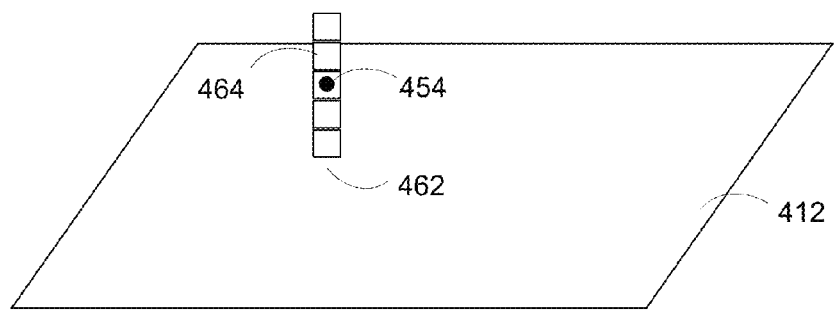

FIG. 4H illustrates digital entries for points within a threshold of two detected depth points, according to an example embodiment. More specifically, point 454 may be identified as a first detected depth point that projects to a location 462 on plane 412. A column 464 of digital entries may be stored for points located within a threshold buffer (e.g., 2 pixels above and 2 pixels below) from the first detected depth point 454. Additionally, point 456 may be identified as a second detected depth which projects to the same location 462 on plane 412, but is not located within the threshold buffer from point 454. A second column 466 of digital entries may then be stored for points located within the threshold buffer from the second detected depth point 456.

In further examples, values may then be accumulated for digital entries within both columns. For instance, a ray from an optical sensor to a detected depth point which crosses through a point corresponding to a digital entry from the first column or the second column may be used to determine distance values to average into the accumulated values for the digital entries. In some examples, significant savings may still be obtained by accumulating two or more digital columns for particular locations in the projection rather than accumulating values for a regular grid covering the entire area.

In some examples, two columns for a particular location in the projection may be used to determine the digital height map by selecting between a zero crossing from each column. For instance, one column may represent a surface that is not of interest or may simply be the result of noise. In some examples, the selection of which column to use may be made based on which column had more detected depth points over a certain period of time. In other examples, the selected of which column to use may be made based on detected depth points in neighboring columns relative to the plane and/or zero crossings in neighboring columns as well or instead.

In further examples, two columns for a particular location in the projection may be used to determine the digital height map by including zero crossings from both column. For instance, the two zero crossings may be used to identify an occluded edge of an object and/or a length of an occluded edge of the object, such as illustrated with respect to FIG. 4H. In another example, the two zero crossings may be used to identify a first surface which partially or fully occludes a second surface relative to the plane. For instance, a first object may be identified which occludes a second object within the environment.

Figure 5A:
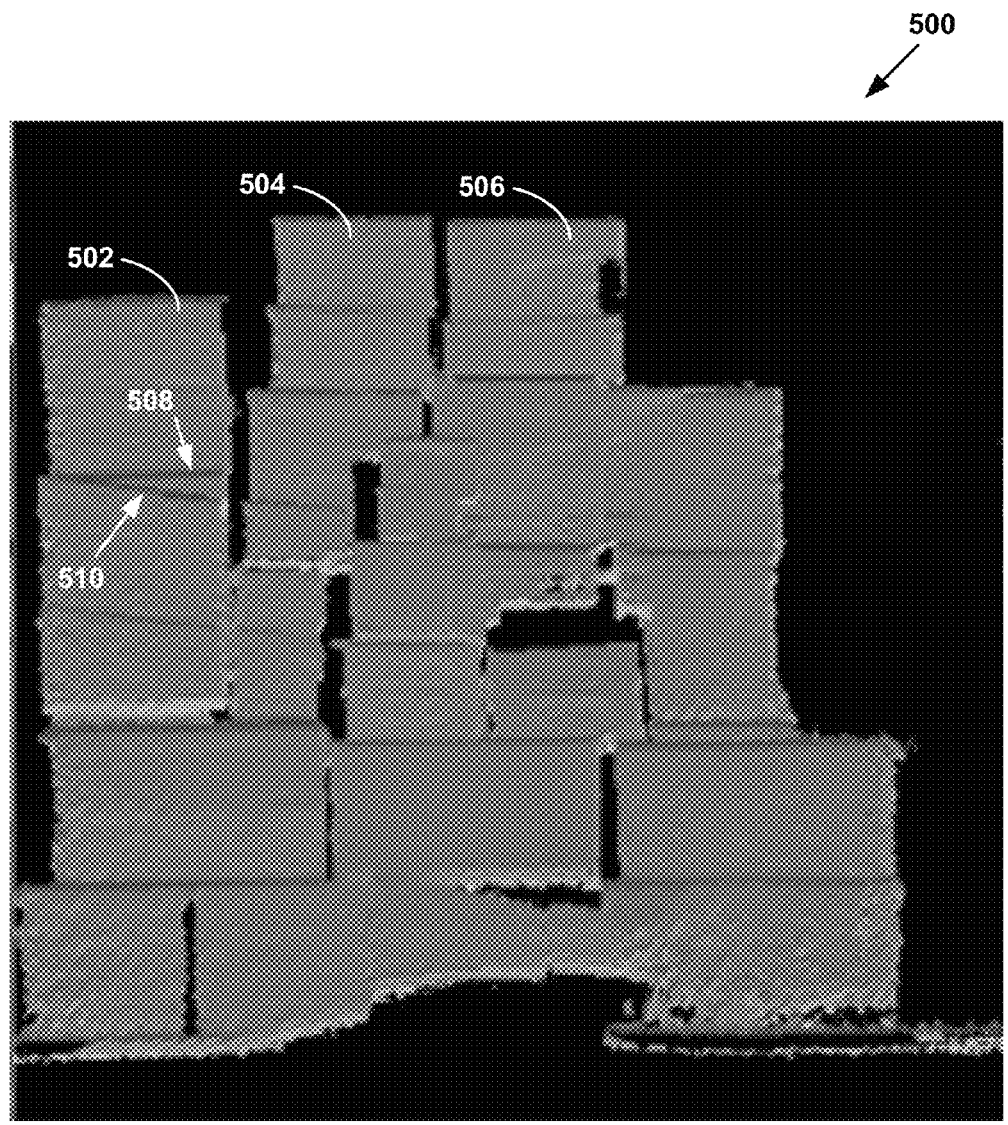
FIGS. 5A-5C illustrate applications of environment reconstruction, according to an example embodiment.
Figure 5B:
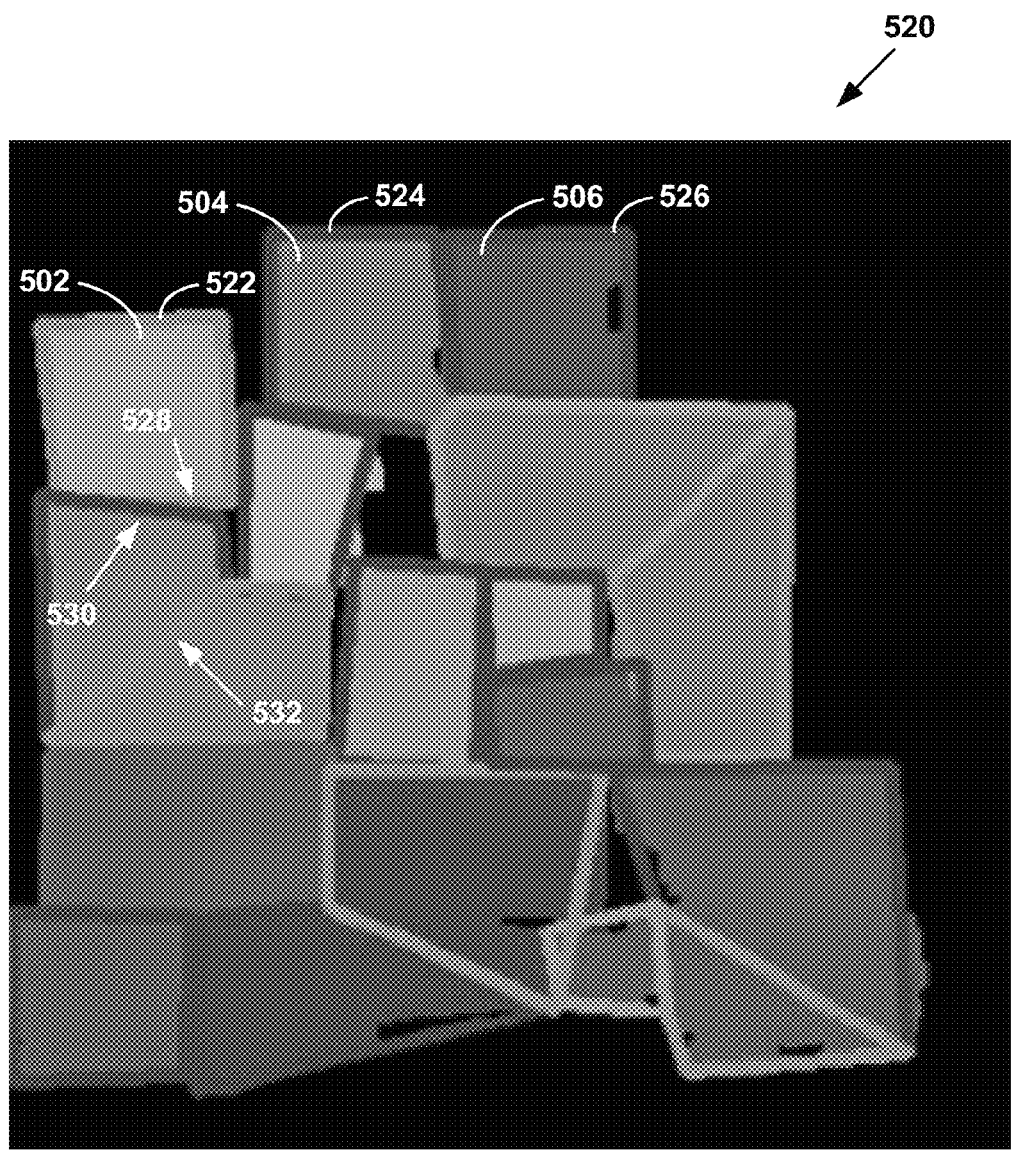
Figure 5C:
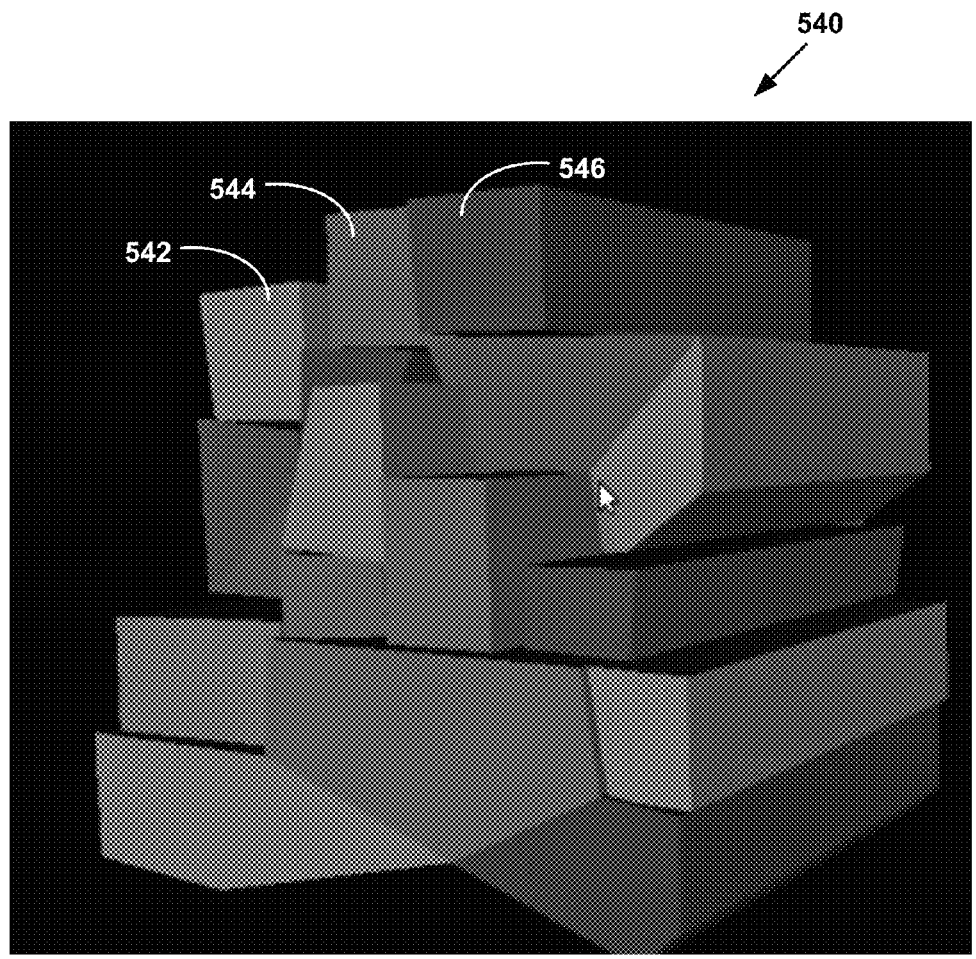

FIGS. 5A-5C illustrate applications of environment reconstruction, according to an example embodiment. In particular, these figures illustrate example aspects of a strategy for selecting boxes which may use methods for digital environment reconstruction described herein.

First, FIG. 5A illustrates an example 2D image 500 of a facade of boxes that includes a height map, with shading indicating the surface indentations of the height map. In particular, the example 2D image 500 may be a 2D orthographic projection (e.g., of a TSDF volume) created by scanning a camera along a facade of boxes. In a stacked arrangement of boxes such as those shown in the facade, an example strategy may involve which box to select first, and in this case, boxes 502, 504, and 506 may be most ideal to move first due to how distinguishable they are compared to other potential boxes shown in the 2D image 500 and due to how they do not have other boxes on top of them. As such, selecting those boxes and moving those boxes may not disturb the rest of the stack, and thus, boxes 502, 504, and 506 may be selected as candidate boxes. In some examples, further criteria, such as an exposed side (with no other boxes proximate to that side), or a particular box being higher than other boxes, may be used to choose a box (and/or subsequent boxes) to select from the candidates.

As shown, other boxes below boxes 502-506 are more closely proximate to one another and less distinguishable. Further, in a scenario such as that shown in FIG. 5A, the 2D image 500 may include indications of potential edges of boxes 508, 510 which may or may not correspond to box edges. Such uncertainty may arise from occlusion, dropouts, and other viewpoint-related issues with the construction of the virtual environment (i.e., the construction of the volume). It is also clear that there are other portions of the facade which do not have enough information to determine box outlines. When potential edges 508, 510 or other portions of the facade may not, in actuality, be correct identifiers of box edges, the computing device may not use these edges/portions when determining the one or more portions of the 2D image 500.

The facade may also be used in this example strategy to determine what regions of the facade need further information to distinguish boxes. By examining the facade for issues such as occlusion, dropouts, etc., it is possible to determine regions that need further scanning to make decisions about boxes to be picked. Removing a box may also provide an opportunity to get more information about the facade, which had been hidden by the box being removed.

As described above, the facade may also functions to create a set of 3D convex bodies to determine collisions for a path planner of a robotic manipulator, for instance. FIG. 5B illustrates an image 520 similar to the 2D image 500 of FIG. 5A resulting from one iteration of the computing device determining one or more portions of that 2D image 500. In particular, the computing device may segment the facade into planar regions, and then each region is further segmented into convex sub-regions. As shown, the computing device may determine portions 522, 524, and 526 which correspond to boxes 502, 504, and 506, respectively, where edges of portions 522, 524, and 526 are similar to edges shown in the depth map of the 2D image 500. In particular, edge 528 of portion 522 corresponds to the potential edge 508 of box 502, though edge 530, which corresponds to the potential edge 510, is also determined to be an edge of another determined portion. Also, edges such as edge 532, though not likely an actual edge of a box in the physical environment, may be determined, perhaps due to a recognizable fold or other feature of a box that resembles the form of edge 532.

In FIG. 5B, the facade is segmented into planar regions, and then each region is further segmented into convex sub-regions. Each of the sub-regions can then be extruded along its normal to create a set of 3D convex bodies, shown in FIG. 5C. These convex bodies are then used for collision detection during the planning process.

Lastly, FIG. 5C illustrates a 3D representation 540 of the one or more portions of image 520. In particular, each of the sub-regions noted above with respect to FIG. 5B may be extruded along its normal to create a set of 3D convex bodies. The computing device may then use these convex bodies for collision detection during the planning process.

Accordingly, as shown, each portion of image 520 has been extruded out as a convex 3D model, including fairly box-shaped 3D model representations 542, 544, and 546 corresponding to portions 522, 524, 526, respectively, and to boxes 502, 504, and 506, respectively. As shown, each extruded 3D model varies in length, and the extrusion length of each 3D model may be determined in accordance with one or more of the factors noted above, such as a predetermined average length of the boxes. After the 3D representation 540 is determined, any one of 3D models 542, 544, and 546 may be selected to be moved by a robotic manipulator based on the likelihood that they accurately resemble the actual size and shape of boxes 502, 504, or 506. By moving one of those boxes, boxes below those may become more distinguishable in subsequent 2D images and 3D representations, as boxes may be moved one by one from the stack from top to bottom. Alternatively, subsequent portions and corresponding 3D representations of those portions may be determined before the computing device determines which box to select for movement.

Figure 6A:
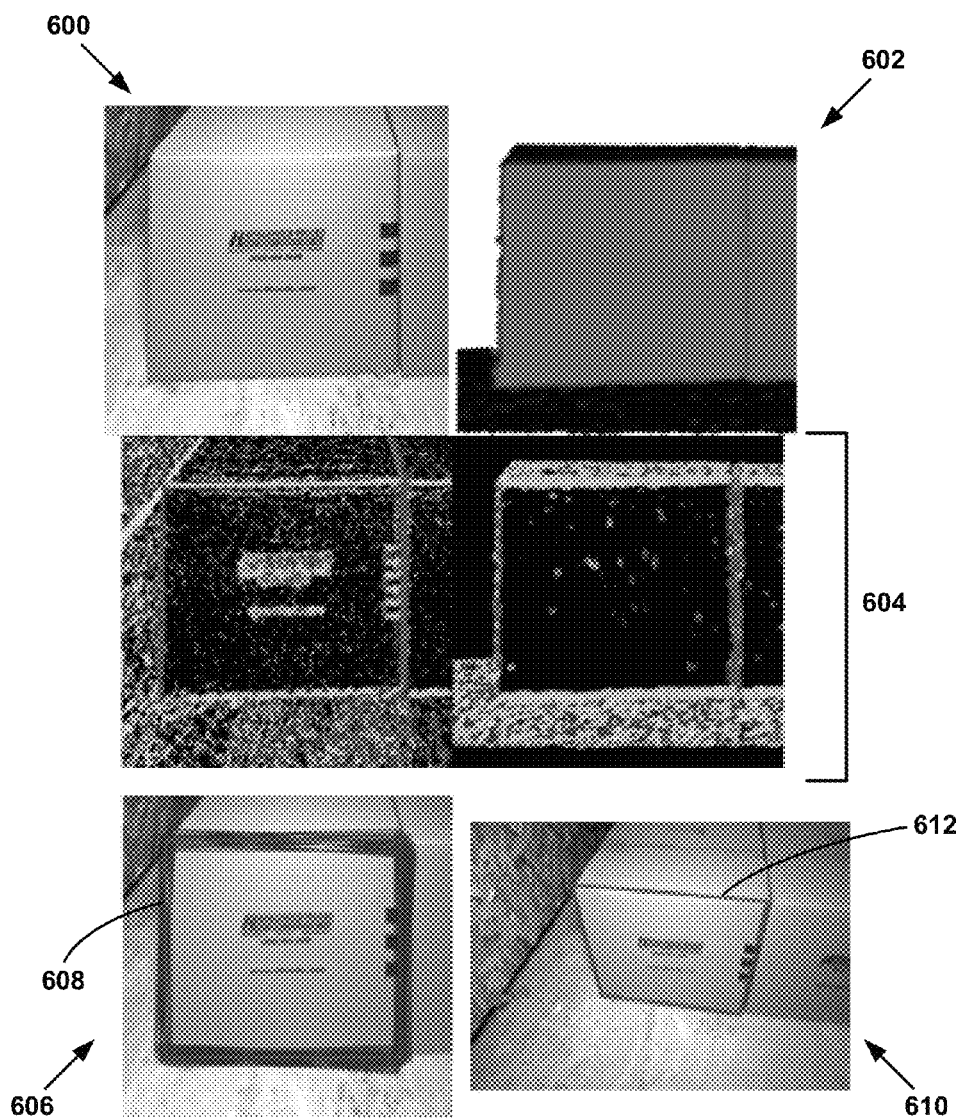
FIGS. 6A-6B illustrate additional applications of environment reconstruction, according to an example embodiment.
Figure 6B:
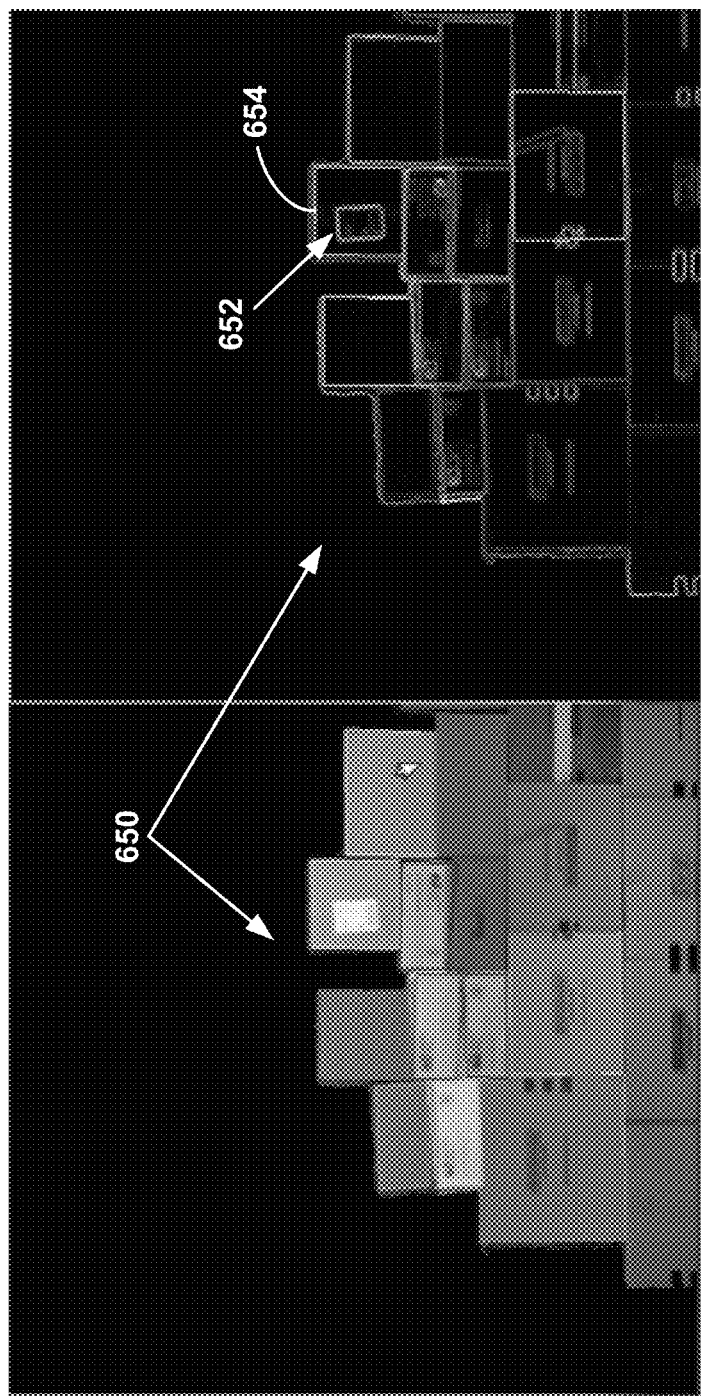

FIGS. 6A and 6B illustrate example aspects of a strategy for picking boxes using the 3D and 2D representations described above, and may serve as further aspects of the strategy described with respect to FIGS. 5A-5C.

In addition to the facade volume described above with respect to FIG. 5A, there may also be smaller volumes with finer resolution for detecting boxes or other 3D objects using templates. FIG. 6A illustrates example projections from a smaller, high resolution TSDF. The top two images are the orthographic projection of the visual 600 and depth 602 maps. The middle two images 604 show features extracted from the images. Here, straight line segments are the main feature that is used here to detect parallelogram structures (i.e., "portions"), although other features may be used in addition to or alternatively to straight line segments in this example or other examples not described herein. The bottom left image 606 shows a set of templates that delineate the parallelogram that is extracted from the line segments; the best-fit template 608 is highlighted. As shown in the bottom right image 610, the best-fit template 608 is altered 612 and projected back to an original view of the box, identifying the face of the box.

In some example implementations, the computing device may also scan larger regions at high resolution to detect boxes or other physical objects. FIG. 6B illustrates a set of boxes 650 that may be detected, in accordance with at least some embodiments described herein. In this example, physical constraints among the boxes may be used to remove box detection hypotheses that do not fit into an overall configuration of boxes. For instance, although a label 652 that is coupled to a surface of one of the topmost boxes is detected as a parallelogramatic structure, that label 652 may not be identified as a box because there is a stronger-confidence hypothesis for the parallelogramatic structure 654 that encloses the label.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims.

The above detailed description describes various features and functions of the disclosed systems, devices, and methods with reference to the accompanying figures. In the figures, similar symbols typically identify similar components, unless context dictates otherwise. The example embodiments described herein and in the figures are not meant to be limiting. Other embodiments can be utilized, and other changes can be made, without departing from the spirit or scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

A block that represents a processing of information, such as a block of method 300 described above, may correspond to circuitry that can be configured to perform the specific logical functions of a herein-described method or technique. Alternatively or additionally, a block that represents a processing of information may correspond to a module, a segment, or a portion of program code (including related data). The program code may include one or more instructions executable by a processor for implementing specific logical functions or actions in the method or technique. The program code and/or related data may be stored on any type of computer readable medium such as a storage device including a disk or hard drive or other storage medium.

The computer readable medium may also include non-transitory computer readable media such as computer-readable media that stores data for short periods of time like register memory, processor cache, and random access memory (RAM). The computer readable media may also include non-transitory computer readable media that stores program code and/or data for longer periods of time, such as secondary or persistent long term storage, like read only memory (ROM), optical or magnetic disks, compact-disc read only memory (CD-ROM), for example. The computer readable media may also be any other volatile or non-volatile storage systems. A computer readable medium may be considered a computer readable storage medium, for example, or a tangible storage device.

Moreover, a block that represents one or more information transmissions may correspond to information transmissions between software and/or hardware modules in the same physical device. However, other information transmissions may be between software modules and/or hardware modules in different physical devices.

The particular arrangements shown in the figures should not be viewed as limiting. It should be understood that other embodiments can include more or less of each element shown in a given figure. Further, some of the illustrated elements can be combined or omitted. Yet further, an example embodiment can include elements that are not illustrated in the figures.

While various aspects and embodiments have been disclosed herein, other aspects and embodiments will be apparent to those skilled in the art. The various aspects and embodiments disclosed herein are for purposes of illustration and are not intended to be limiting, with the true scope being indicated by the following claims.

What is claimed is:

1. A method, comprising:
    receiving, from at least one depth sensor, a plurality of detected depth points indicative of depths of at least one surface within an environment along rays from the at least one depth sensor;
    determining, by a computing device, a projection of the plurality of detected depth points onto a plane within the environment;
    identifying, by the computing device, a plurality of first detected points from the plurality of detected depth points, wherein a first detected point comprises a first point at a particular location of the plane in the projection;
    storing, by the computing device, digital entries corresponding to points located within a threshold buffer from one of the first detected points relative to the plane;
    determining, by the computing device, values for the digital entries, wherein a value for a digital entry corresponding to a particular point comprises an accumulation of distances from detected depth points along one or more of the rays that cross the particular point; and
    determining, by the computing device, a digital height map representative of heights of the at least one surface in the environment relative to the plane, wherein the heights of the at least one surface at particular locations in the digital height map are determined based on points where the values for the digital entries cross zero.

2. The method of claim 1, wherein the accumulation of distances from detected depth points along one or more of the rays comprises an average of signed distance values, wherein a signed distance value for a ray from a depth sensor to a detected depth point is zero at the detected depth point, increases in a direction towards the depth sensor, and decreases in a direction away from the depth sensor.

3. The method of claim 1, wherein the plane in the environment comprises a ground floor within the environment.

4. The method of claim 1, wherein the digital entries correspond to an equal number of points above and below a first detected point relative to the plane.

5. The method of claim 1, wherein the threshold buffer comprises two pixels above and two pixels below one of the first detected points relative to the plane.

6. The method of claim 1, further comprising:
    identifying a physical object within the environment based on the digital height map representative of heights of the at least one surface in the environment relative to the plane; and
    providing instructions to a robotic manipulator to move the identified physical object.

7. The method of claim 6, where one or more of the at least one depth sensor is physically coupled to the robotic manipulator, and wherein the computing device comprises a control system of the robotic manipulator.

8. The method of claim 1, further comprising:
    identifying a plurality of second detected points from the plurality of detected depth points, wherein a second detected point comprises a second point at a same location of the plane in the projection as a first detected point, and wherein the second detected point is further away from the first detected point than the threshold buffer; and
    storing additional digital entries corresponding to points located within the threshold buffer from one of the second detected points relative to the plane.

9. The method of claim 8, further comprising using the digital entries corresponding to points located within the threshold buffer from a first detected point and points located within the threshold buffer from a second detected point at a same location of the plane in the projection to identify a first object that overlaps at least a portion of a second object relative to the plane within the environment.

10. The method of claim 8, further comprising using the digital entries corresponding to points located within the threshold buffer from a first detected point and points located within the threshold buffer from a second detected point at a same location of the plane in the projection to determine a length of an occluded edge of an object within the environment.

11. A non-transitory computer readable medium having stored thereon instructions that, upon execution by a computing device, cause the computing device to perform functions comprising:
    receiving, from at least one depth sensor, a plurality of detected depth points indicative of depths of at least one surface within an environment along rays from the at least one depth sensor;
    determining a projection of the plurality of detected depth points onto a plane within the environment;
    identifying a plurality of first detected points from the plurality of detected depth points, wherein a first detected point comprises a first point at a particular location of the plane in the projection;
    storing digital entries corresponding to points located within a threshold buffer from one of the first detected points relative to the plane;
    determining values for the digital entries, wherein a value for a digital entry corresponding to a particular point comprises an accumulation of distances from detected depth points along one or more of the rays that cross the particular point; and
    determining a digital height map representative of heights of the at least one surface in the environment relative to the plane, wherein the heights of the at least one surface at particular locations in the digital height map are determined based on points where the values for the digital entries cross zero.

12. The non-transitory computer readable medium of claim 11, wherein the plane in the environment comprises a ground floor within the environment.

13. The non-transitory computer readable medium of claim 11, wherein the threshold buffer comprises five pixels above and five pixels below one of the first detected points relative to the plane.

14. The non-transitory computer readable medium of claim 11, wherein the accumulation of distances from detected depth points along one or more of the rays comprises an average of signed distance values, wherein a signed distance value for a ray from a depth sensor to a detected depth point is zero at the detected depth point, increases in a direction towards the depth sensor, and decreases in a direction away from the depth sensor.

15. The non-transitory computer readable medium of claim 11, wherein the functions further comprise:
   identifying a plurality of second detected points from the plurality of detected depth points, wherein a second detected point comprises a second point at a same location of the plane in the projection as a first detected point, and wherein the second detected point is further away from the first detected point than the threshold buffer; and
   storing additional digital entries corresponding to points located within the threshold buffer from one of the second detected points relative to the plane.

16. A system comprising:
   at least one depth sensor; and
   a control system configured to:
      receive, from at least one depth sensor, a plurality of detected depth points indicative of depths of at least one surface within an environment along rays from the at least one depth sensor;
      determine a projection of the plurality of detected depth points onto a plane within the environment;
      identify a plurality of first detected points from the plurality of detected depth points, wherein a first detected point comprises a first point at a particular location of the plane in the projection;
      store digital entries corresponding to points located within a threshold buffer from one of the first detected points relative to the plane;
      determine values for the digital entries, wherein a value for a digital entry corresponding to a particular point comprises an accumulation of distances from detected depth points along one or more of the rays that cross the particular point; and
      determine a digital height map representative of heights of the at least one surface in the environment relative to the plane, wherein the heights of the at least one surface at particular locations in the digital height map are determined based on points where the values for the digital entries cross zero.

17. The system of claim 16, further comprising a robotic manipulator, wherein the control system is further configured to:
   identify a physical object within the environment based on the digital height map representative of heights of the at least one surface in the environment relative to the plane; and
   provide instructions to the robotic manipulator to move the identified physical object.

18. The system of claim 17, where one or more of the at least one depth sensor is physically coupled to the robotic manipulator.

19. The system of claim 15, wherein the control system is further configured to:
   identify a plurality of second detected points from the plurality of detected depth points, wherein a second detected point comprises a second point at a same location of the plane in the projection as a first detected point, and wherein the second detected point is further away from the first detected point than the threshold buffer; and
   store additional digital entries corresponding to points located within the threshold buffer from one of the second detected points relative to the plane.

20. The system of claim 19, wherein the control system is further configured to use the digital entries corresponding to points located within the threshold buffer from a first detected point and points located within the threshold buffer from a second detected point at a same location of the plane in the projection to identify a first object that overlaps at least a portion of a second object relative to the plane within the environment.

* * * * *